US012775095B1

(12) United States Patent
Almalki et al.

(10) Patent No.: US 12,775,095 B1
(45) Date of Patent: Oct. 27, 2026

(54) COMPUTING METHODS AND SYSTEMS FOR GENERATING AND AUTHORING SPATIAL DATA ASSOCIATED WITH A PHYSICAL ENVIRONMENT

(71) Applicant: Saudi Technology and Security Comprehensive Control Co. Ltd., Riyadh (SA)

(72) Inventors: Fayez Ali Almalki, Riyadh (SA); Hany Ahmed Elshshtawy, Riyadh (SA); Faris Saad Alshehri, Riyadh (SA); Mazen Msaad Alqulayti, Riyadh (SA); Mohammed Omar Alahmare, Riyadh (SA)

(73) Assignee: Saudi Technology and Security Comprehensive Control Co. Ltd., Riyadh (SA)

( * ) Notice: Subject to any disclaimer, the term of this patent is extended or adjusted under 35 U.S.C. 154(b) by 0 days.

(21) Appl. No.: 19/563,977

(22) Filed: Mar. 11, 2026

(51) Int. Cl.
*G06T 17/00* (2006.01)
*G01S 17/89* (2020.01)
*G01S 17/931* (2020.01)
*G06T 7/73* (2017.01)
*G06T 19/00* (2011.01)

(52) U.S. Cl.
CPC ............ *G01S 17/89* (2013.01); *G01S 17/931* (2020.01); *G06T 7/73* (2017.01); *G06T 19/00* (2013.01); *G06T 2210/21* (2013.01); *G06T 2210/56* (2013.01)

(58) Field of Classification Search
CPC ......... G01S 17/89; G01S 17/931; G06T 7/73; G06T 19/00; G06T 2210/21; G06T 2210/56
See application file for complete search history.

(56) References Cited

U.S. PATENT DOCUMENTS

2019/0251743 A1* 8/2019 Koyama ................ G01C 21/36
2022/0395748 A1* 12/2022 Salvi ..................... A63F 13/352
2024/0257443 A1* 8/2024 Choy ........................ G06T 1/20

* cited by examiner

*Primary Examiner* — Ian Jen
(74) *Attorney, Agent, or Firm* — Baker & McKenzie LLP

(57) ABSTRACT

The disclosed methods and systems are directed to: receiving, with a first scanning device, first scan data; receiving, with the first scanning device or a second scanning device, second scan data; generating visual data from the first scan data; generating collision data from the first scan data or the visual data; generating feature data from the second scan data; and generating spatial data comprising the visual data, the collision data, and the feature data. The spatial data enables 3D display on a mixed reality device, an augmented reality device, or a mobile computing device; navigation using the collision data; and control of virtual objects using the feature data. The method further generates a first library of data objects, executes an authoring instruction to produce updated spatial data, renders a representation, and displays navigation, contextual, attribute, compliance, and identifier data.

20 Claims, 9 Drawing Sheets

COMPUTING METHODS AND SYSTEMS FOR GENERATING AND AUTHORING SPATIAL DATA ASSOCIATED WITH A PHYSICAL ENVIRONMENT

TECHNICAL FIELD

The present disclosure relates to systems and methods for generating interactive spatial data representing a physical environment.

BACKGROUND

Navigation and other spatial interactive systems face persistent challenges in computationally generating and using spatial data that facilitate authoring and/or dynamic configuration features that enable modeling urban and/or non-urban environments.

SUMMARY

The disclosed method for rendering interactive spatial data representing a physical environment comprises: receiving, using a first scanning device, first scan data associated with a physical environment; receiving, using the first scanning device or a second scanning device, second scan data of the physical environment; generating, based on the first scan data, visual data (e.g., a visual map) of the physical environment; generating, based on the first scan data or the visual data (e.g., the visual map), collision data (e.g., a collision map) associated with the physical environment; generating, based on the second scan data, feature data (e.g., a feature map) associated with the physical environment; generating, based on the visual data (e.g., the visual map), the collision data (e.g., the collision map), and the feature data (e.g., the feature map), spatial data (e.g., a spatial map) of the physical environment, the spatial data (e.g., a spatial map) comprising the visual data (e.g., the visual map), the collision data (e.g., the collision map), and the feature data (e.g., the feature map), such that: the visual data (e.g., the visual map) comprised in the spatial data (e.g., the spatial map) enables displaying a 3-dimensional (3D) representation of the physical environment on a display device associated with one of a mixed reality device, an augmented reality device, or a mobile computing device, the collision data (e.g., the collision map) comprised in the spatial data (e.g., the spatial map) enables navigating the physical environment using the display device, and the feature data (e.g., the feature map) comprised in the spatial data (e.g., the spatial map) enables updating or controlling one or more virtual objects representing one or more physical objects in the physical environment; generating, based on the spatial data (e.g., the spatial map), a first library of data objects that is useable in an authoring computing operation for the updating or controlling the one or more virtual objects representing the one or more physical objects in the physical environment; in response to receiving an authoring instruction associated with the spatial data (e.g., the spatial map), executing, based on the feature data (e.g., the feature map) or the first library of data objects, the authoring computing operation for the updating or controlling the one or more virtual objects representing the one or more physical objects in the physical environment, thereby generating updated spatial data (e.g., an updated spatial map) comprising one or more updated virtual objects associated with the physical environment; receiving, a map request; initiating rendering, based on the map request, an interactive 3D representation of the updated spatial data (e.g., the updated spatial map) on the display device; and enabling display of, based on the rendering, one or more of: navigation data on the display device, thereby providing at least one of: path guidance within the physical environment, turn-by-turn directional data within the physical environment, wayfinding cue data within the physical environment, or route confirmation data associated with the physical environment, contextual data associated with at least one detected physical object in the physical environment on the display device, attribute data associated with the at least one detected physical object in the physical environment on the display device, compliance or operational data associated with the at least one detected physical object in the physical environment on the display device, and identifier data associated with the at least one detected physical object in the physical environment on the display device.

In other embodiments, a system and a computer program product can include or execute the method described above. These and other implementations may each optionally include one or more of the following features.

The first scanning device comprises a first Light Detection and Ranging (LiDAR) system or a first depth sensing system while the second scanning device comprises the first LiDAR system or the first depth sensing system, or a second LiDAR system or a second depth sensing system, according to some embodiments.

Furthermore, the first scan data referenced above can comprise first 3D image data associated with the physical environment while the second scan data comprises second 3D image data associated with the physical environment.

According to one embodiment, at least one of: the visual data (e.g., the visual map) comprises a photorealistic high-fidelity 3D presentation of the physical environment configured for immersive data manipulation when rendered on the display device; the collision data (e.g., the collision map) is based on a pathfinding control logic that automatically constructs one or more spatial navigation pathways in the physical environment, the collision data (e.g., the collision map) being optimized for one or more of—collision or motion dynamics in the physical environment, human or non-human behavior evaluation in the physical environment, interaction analysis between: two or more humans in the physical environment, two or more objects in the physical environment, or a human and a virtual object or non-virtual object in the physical environment, or approximate scene visualization of the physical environment; the visual data (e.g., the visual map) has a first resolution that is greater than a second resolution of the collision data (e.g., the collision map), and the feature data (e.g., the feature map) is based on a Visual Positioning System (VPS) computing process that: extracts one or more spatial features associated with the physical environment, and anchors one or more virtual objects to the one or more spatial features for accurate localization within the physical environment.

In exemplary implementations, the mixed reality device or the mobile computing device comprises at least one sensor comprising at least one of: (LiDAR) depth sensor; a multi-camera depth system; a Red-Green-Blue (RGB) wide camera; an RGB ultra-wide camera; an RGB telephoto camera; a first Inertial Measurement Unit (IMU) comprising an accelerometer; a second IMU comprising a gyroscope; a third IMU comprising a magnetometer; an ambient light and proximity sensor; a Simultaneous Localization and Mapping (SLAM)-oriented visual sensor including a vision-based tracking camera; a barometer; a Global Navigation Satellite System (GNSS) or a Global Positioning System (GPS) receiver; an Ultra-Wideband (UWB) radio; or a Wi-Fi or a Bluetooth beacon.

In some cases, the mixed reality device, the augmented reality device, or the mobile computing device is configured for intelligently detecting or sensing one or more of image data, depth and range data, motion data, location data, environmental data, spatial mapping data, or Visual Positioning System (VPS) data, real-time video data or image data associated with the physical environment using the mixed reality device or the mobile computing device.

Additionally, the interactive 3D representation of the updated spatial data (e.g., the updated spatial map) comprises one or more of: structural element data associated with a physical surface of a structure in the physical environment; surface geometry data associated with a pathway within the physical environment; environmental object data associated with one or more objects in the physical environment; navigation data associated with the physical environment; or landmark data associated with the physical environment.

It is appreciated that the map request is processed based on: detecting an object in the physical environment using one of the mixed reality device, the augmented reality device, or the mobile computing device; generating, based on the detecting, raw object data associated with the physical environment; applying at least one intelligence model to analyze the raw object data associated with the physical environment, thereby generating context data associated with the physical environment; and generating, based on the context data, the interactive 3D representation of the updated spatial data (e.g., the updated spatial map), the context data comprising one or more of: metadata associated with the object, location attribute data associated with the object, navigation rules data associated with the physical environment, operational context data associated with the physical environment, environmental context data associated with the physical environment, or user data associated with the at least one of the mixed reality device, the augmented reality device, or the mobile computing device.

It is further appreciated that the physical environment is a dynamic environment associated with time-varying conditions that are detectable using the at least one of the mixed reality device, the augmented reality device, or the mobile computing device, the time-varying conditions including at least one of: an object in motion, a person in motion, or a detected changing environmental state associated with the physical environment.

In some instances: the visual data (e.g., the visual map) has a first coordinate system and a first pivot; the collision data (e.g., the collision map) has a second coordinate system and a second pivot; and the feature data (e.g., the feature map) has a third coordinate system and a third pivot.

Furthermore, combining (e.g., aligning or merging) the visual data (e.g., the visual map), the collision data (e.g., the collision map), and the feature data (e.g., the feature map) comprises: determining, based on location data associated with the physical environment, a reference coordinate system associated with the physical environment; transforming, based on the first coordinate system and the first pivot, the visual data (e.g., the visual map) into the reference coordinate system to generate first map transform data; transforming, based on the second coordinate system and the second pivot, the collision data (e.g., the collision map) into the reference coordinate system to generate second map transform data; transforming, based on the third coordinate system and the third pivot, the feature data (e.g., the feature map) into the reference coordinate system to generate third map transform data; and aligning the first map transform data, the second map transform data, and the third map transform data to generate the spatial data (e.g., the spatial map).

In some implementations, the location data associated with the physical environment comprises one or more of: an indication associated with whether the physical environment is indoors or outdoors; availability of one or more referent anchors associated with the physical environment including one or more of geographic information system (GIS) readings associated with the physical environment; Internet-of-Things (IoT) or beacon data associated with the physical environment; feature data from visual positioning system (VPS) readings associated with the physical environment; or point cloud data associated with the physical environment.

According to one embodiment, generating the visual data (e.g., the visual map) comprises: constructing a point cloud of the physical environment; applying 3D Gaussian splatting to points within the point cloud; and reconstructing, based on the applying, a photorealistic representation of objects within the physical environment.

Furthermore, combining the visual data (e.g., the visual map), the collision data (e.g., the collision map), and the feature data (e.g., the feature map) further comprises generating, based on at least the spatial data (e.g., the spatial map), the second library of data objects described elsewhere herein and which comprises at least one of: a geometric data object, an animation enabled spatial file, or a material defined 3D object, the second library of data objects is associated with profile data associated with at least one of the mixed reality device, the augmented reality device, or the mobile computing device, and the second library of data objects is usable by a user associated with the profile data when interacting with the updated spatial data (e.g., the updated spatial map) based on the map request.

In some embodiments, the identifier data comprises one or more of: license plate number data associated with a vehicle; asset tag data associated with the at least one detected physical object; QR code data associated with the at least one detected physical object; Near Field Communication (NFC) token data associated with the at least one detected physical object; or machine-readable identifier associated with the at least one detected physical object.

It is further appreciated that the updated spatial data (e.g., the updated spatial map) comprises a data file configured for at least one of: implementing computing operations associated with managing the physical environment; implementing interactive computing operations associated with the physical environment; crowd management computing operations associated with the physical environment; safety computing operations associated with the physical environment, or entertainment computing operations associated with the physical environment.

In some embodiments, the above method further comprises geo-referencing at least the spatial data (e.g., the spatial map) to the physical environment, the geo-referencing comprising anchoring the visual data (e.g., the visual map) to the Earth based on one or more of: a geographic information system (GIS) reading associated with the physical environment; or a visual-positioning-system (VPS) reading associated with the physical environment.

Additionally, the authoring instruction can be received via one or more computing platforms comprising: a web-browser interface associated with the mobile computing device, or a headset interface associated with the augmented reality device or the mixed reality device. In some instances, the web-browser interface and the headset interface are synchronized such that edits to the updated spatial data (e.g., the updated spatial map) performed via the web-browser interface are reflected (e.g., automatically, synchronously or asynchronously reflected) in the updated spatial data (e.g., the updated spatial map) when rendered on the headset interface. This can also occur vice versa, where updates made via the headset are reflected (e.g., automatically, synchronously, or asynchronously reflected) in the web-browser interface.

BRIEF DESCRIPTION OF DRAWINGS

The disclosure is illustrated by way of example, and not by way of limitation in the figures of the accompanying drawings in which like reference numerals are used to refer to similar elements. It is emphasized that various features may not be drawn to scale, and the dimensions of various features may be arbitrarily increased or reduced for clarity of discussion.

DETAILED DESCRIPTION

Reference will now be made in detail to embodiments, examples of which are illustrated in the accompanying drawings and figures. In the following detailed description, numerous specific details are set forth in order to provide a thorough understanding of the disclosed subject-matter. However, it will be apparent to one of ordinary skill in the art that the methods and systems disclosed may be practiced without these specific details.

As used herein, the term "exemplary" or "illustrative" means "serving as an example, an instance, or an illustration." Any implementation described herein as exemplary or illustrative is not necessarily to be construed as advantageous and/or preferred over other embodiments. Unless the context requires otherwise, throughout the description and the claims, the word "comprise" and variations thereof, such as "comprises" and "comprising" are to be construed in an open, inclusive sense, i.e., as "including, but not limited to."

Furthermore, the terms substantially real-time and near real-time, as used herein, refer to a processing and response timeframe that is close to, but not necessarily equal to, instantaneous or true real-time. While true real-time implies a delay of zero, any practical digital system will have some inherent latency due to data processing, computation, and network transmission. Therefore, these terms describe a timeframe where this inherent latency is sufficiently short as to be negligible for the effective operation of a given process or for the perception of a human user. The specific duration considered to be substantially real-time or near real-time is application-dependent and is defined by the requirements of the system to function as intended without being materially compromised by the delay.

For example, in different embodiments of this disclosure, the acceptable delay can vary significantly. In the context of streaming interactive video or augmented reality, near real-time may correspond to a total latency of less than 200 milliseconds, as longer delays can become perceptible and disruptive to a user. Thus, these terms encompass any timeframe in which the system's response is delivered quickly enough to be relevant and actionable for its specific purpose.

Network Environment

Figure 1:
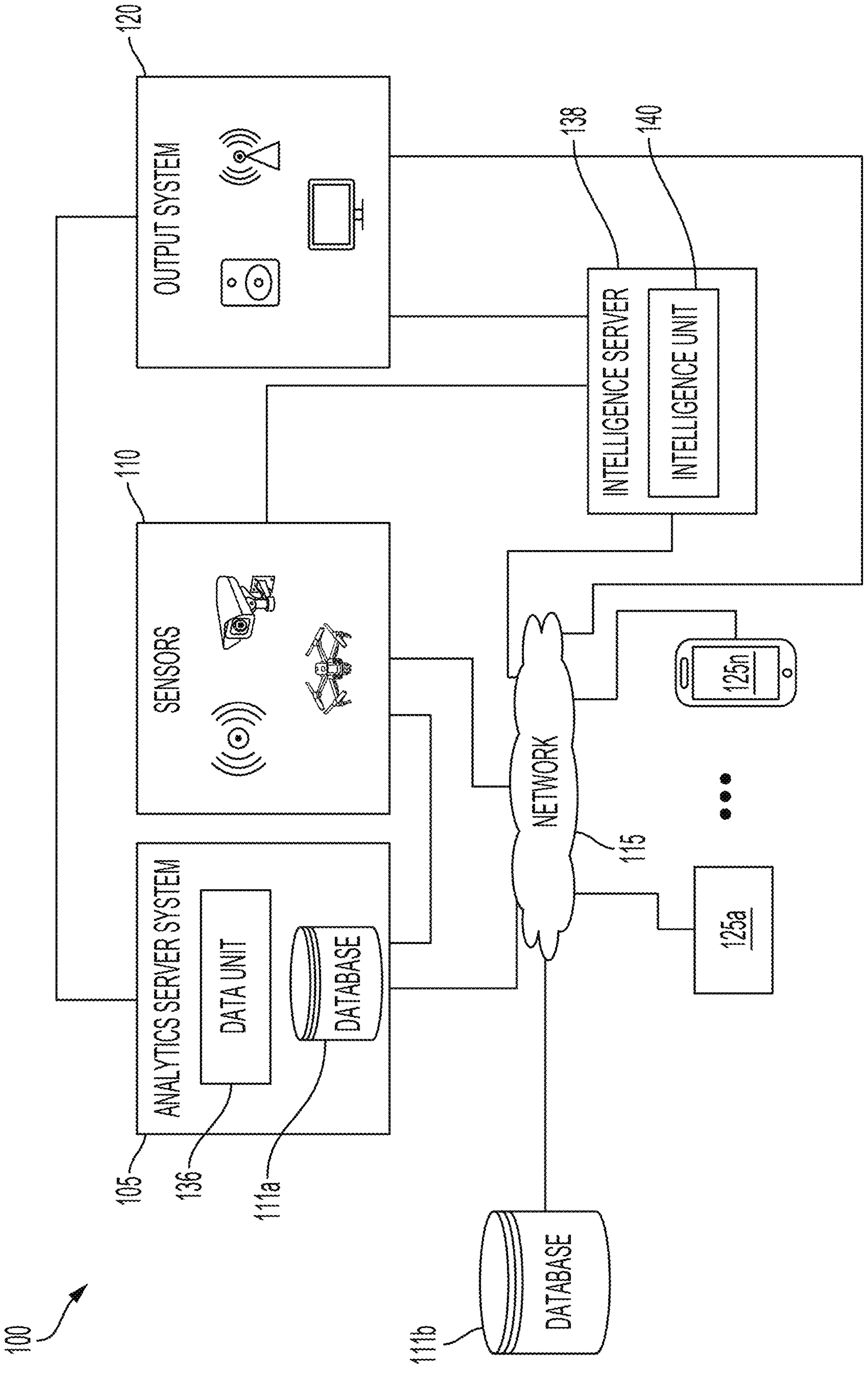
FIG. 1 shows an exemplary network system for executing the principles disclosed.

Shown in FIG. 1 is an exemplary network system 100 for executing the principles disclosed. Specifically, the exemplary network system 100 may be used to implement dynamic tracking of at least motive properties of a vehicle on a roadway. In the illustrated implementation, the network system 100 includes an analytics server system 105, one or more sensors 110, one or more computing databases 111*a* and 111*b*, and one or more output system 120, all of which are communicatively coupled to a network 115. Also connected to the network 115 are one or more endpoint devices 125*a* . . . 125*n* and an intelligence server 138.

It is appreciated that the implementation of the analytics server system 105 and/or the intelligence server 138 may be physically structured in various configurations. In one embodiment, the one or more computing device processors that execute the functions of the analytics server system 105 and/or the intelligence server 138 may be co-located at a single geographical location or housed within a single data center. Alternatively, the one or more computing device processors that execute the functions of the analytics server system 105 and/or the intelligence server 138 may be realized in a distributed computing environment, where multiple computing device processors are spread across disparate physical locations and are communicatively coupled over a network to operate in a coordinated or parallel fashion.

According to one embodiment, the analytics server system 105 includes a computing device such as a content server, a communication server, a laptop computer, a desktop computer, a handheld computing device, a tablet computing device, a virtual machine, a cloud-based computing system and/or a cloud-based service, and/or the like. The analytics server system 105 may include a plurality of computing devices configured to communicate with one another and/or communicate with other systems comprised in the network system 100 to implement the techniques described herein.

According to one embodiment, the analytics server system 105 comprises a data unit 136 (also referred to as one or more data units elsewhere herein) and at least one local computing database 111*a*. For example, results from implementing the disclosed methods may be stored in the local computing database 111*a* or in a remote computing database 111*b* that is physically distal (e.g., implemented in a first location that is different from a second location where the local computing database 111*a* is implemented). According to one embodiment, the local computing database 111*a* and the remote computing database 111*b* may include a non-volatile memory or similar permanent storage device and media. For example, the local computing database 111*a* and the remote computing database 111*b* can be a hard disk drive, a CD-ROM device, a DVD-ROM device, a DVD-RAM device, a DVD-RW device, a flash memory device, solid state media, or some other mass storage device known in the art for storing information on a more permanent basis.

Figure 2:
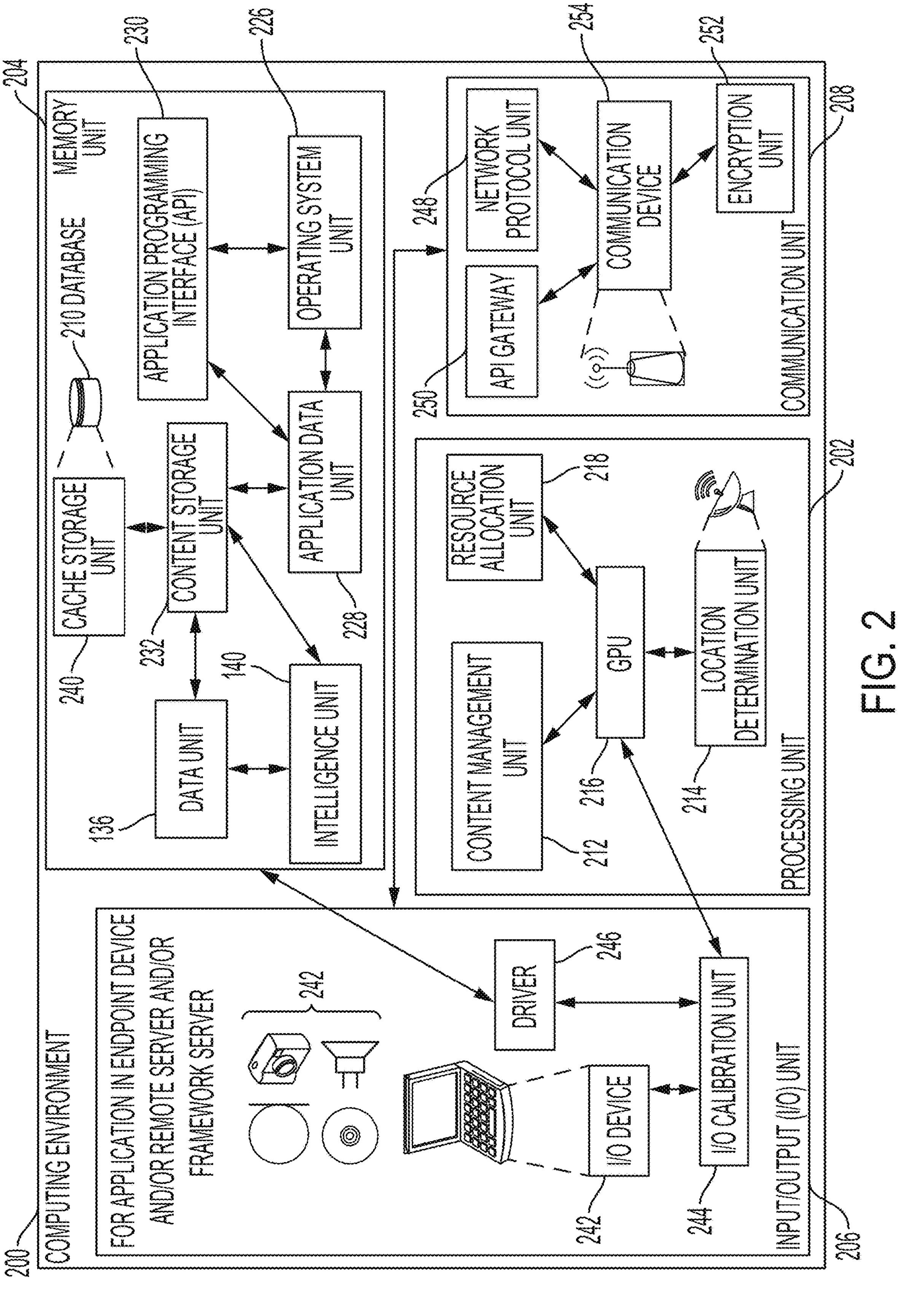
FIGS. 2 and 3 illustrate exemplary system and functional diagrams of a computing environment, within which one or more systems shown in FIG. 1 can be implemented.
Figure 3:
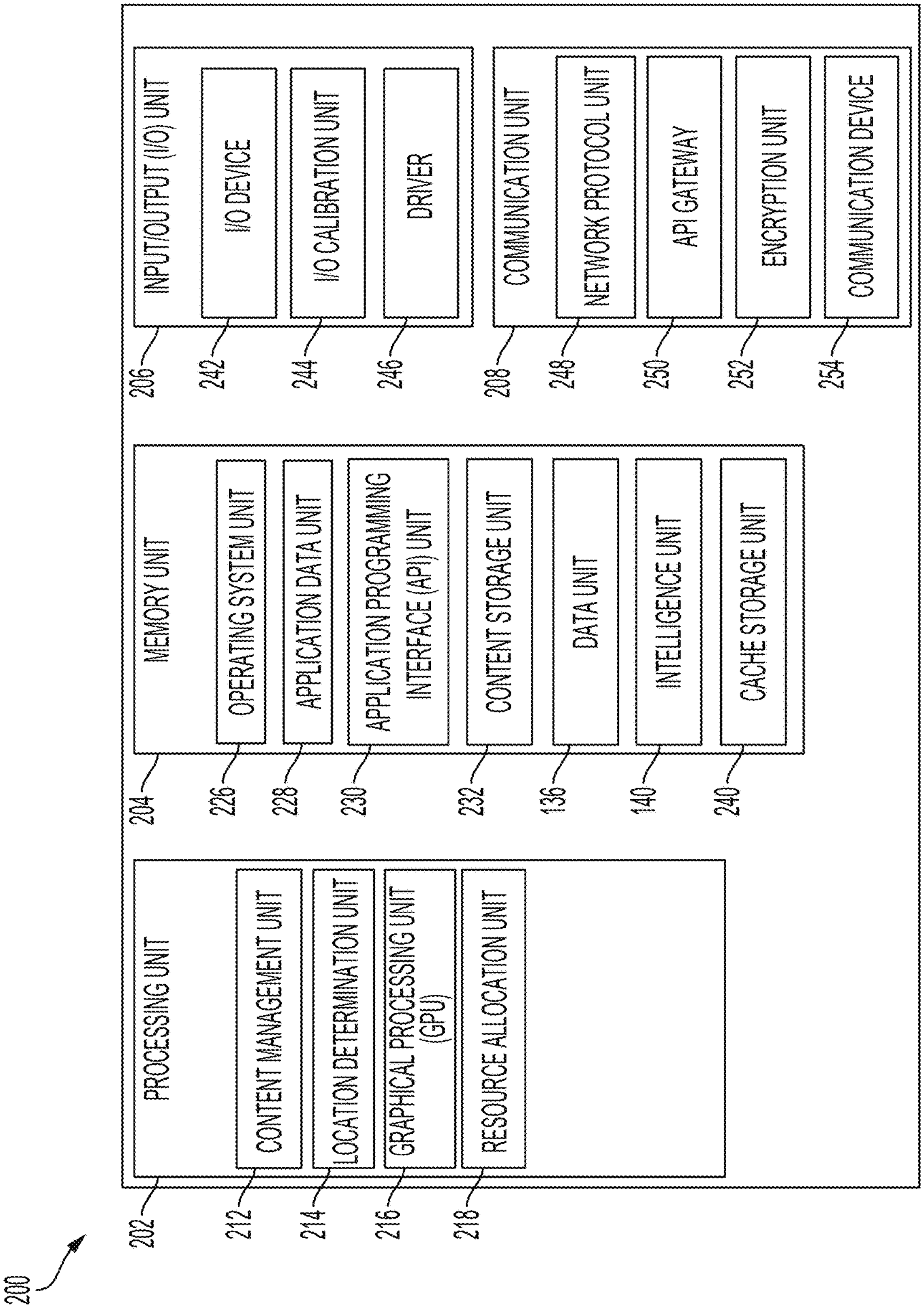

The data unit 136 referenced above may include one or more instructions or computer logic that are executed by the one or more processors such as the processors discussed in association with FIGS. 2 and 3. The data unit 136 referenced herein comprises an executable software module containing one or more instructions or computer-executable logic. These instructions are specifically configured to be executed by one or more processors, such as the processors discussed in association with FIGS. 2 and 3, to perform the disclosed method. In particular, upon execution by said processors, the instructions within the data unit 136 causes a computing system to carry out the specific processing procedures, methods, techniques, and workflows provided in this disclosure. Thus, the data unit 136 represents a tangible software implementation that directs a computing device to function as a specialized machine for executing the disclosed method.

The analytics server system 105 may be configured to communicate with the one or more systems coupled to the network 115. This can include communications between the analytics server system 105 and the sensors 110 to transmit substantially real-time data (e.g., static images or dynamic images including or excluding a video stream, audio data, touch data, LiDAR data, etc.) to the intelligence server 138 to resolve, classify, and identify features of objects (e.g., vehicles) captured by the sensors 110. In addition, this communication can involve the transmission of one or more alerts from the analytics server system 105 to the one or more endpoint devices 125*a* . . . 125*n*.

According to one embodiment, the analytics server system 105 can be coupled, via the network 115, to an intelligence server 138 configured to control or regulate, in conjunction with, or independent of the data unit 136, training of one or more computing models configured for implementing data classification and/or object identification computing operations. In some cases, the intelligence server 138 can comprise one or more intelligence units 140 that can implement computing operations such as: zero-shot learning computing operations, few-shot learning computing operations, and result/model fine-tuning computing operations. Additionally, or alternatively, one or more intelligent artificial intelligence (AI) models and/or machine learning (ML) models may comprise, or be based on at least one of: GPT-4, LLaMA-3, BLOOM, PaLM, GPT-3.5, BERT, Gemini, LaMDA, Perplexity, or Falcon. Additionally, or alternatively, one or more of the AI or ML models may also include multiple intelligence models and therefore may be configured to perform and/or execute multiple processes in parallel. In addition, the AI or ML models disclosed may include various artificial intelligence systems or structures, including but not limited to large language models (LLMs), deep learning models, machine learning models, neural networks (e.g., convolutional neural networks (CNNs), recurrent neural networks (RNNs), transformers), expert systems, decision trees, and reinforcement learning models.

Additionally, or alternatively, one or more of the AI/ML models may also include multiple intelligence models (e.g., separately trained intelligence models) and therefore may be configured to perform and/or execute multiple processes in parallel. In some embodiments, the intelligence server 138 may include a special chipset for processing large amounts of data and/or complex computing operations in a reduced amount of time. These chipsets may include, but are not limited to, Graphics Processing Units (GPUs), Tensor Processing Units (TPUs), Field-Programmable Gate Arrays (FPGAs), Application-Specific Integrated Circuits (ASICs) specifically designed for artificial intelligence (AI) workloads, or neuromorphic chips. Such chipsets can be configured to have parallel computing architectures, enabling efficient execution of matrix multiplications and convolutions, which comprise computing operations in a given intelligence model, particularly deep learning models. This parallel processing capability can allow for rapid ingestion, analysis, and processing of vast datasets, thereby accelerating model training, inference, and overall performance of the intelligence server 138 and/or analytics server system 105. The chipsets referenced herein may further incorporate dedicated memory architectures (e.g., High Bandwidth Memory (HBM)) optimized for the data throughput requirements of large intelligence models.

In some embodiments, the intelligence unit 140, or components thereof, may be implemented and/or deployed on dedicated hardware accelerators embedded within a system-on-chip (SoC) or as discrete integrated circuits. These hardware implementations can facilitate high-speed data processing and low-latency inference, needed for real-time applications such as analyzing captured substantially real-time data. Furthermore, the intelligence server 138, or components thereof, including specialized chipsets and intelligence models, may be provided by a third-party vendor or service provider (e.g., via cloud-based AI/MWL platforms) or may be developed and maintained in-house.

Once captured by the one or more sensors, the substantially real-time data may be transmitted to the analytics server system 105 and/or to the intelligence server 138 for processing. The analytics server system 105, acting as a central hub, can orchestrate the analysis of the data, while the intelligence server, powered by advanced AI and ML computing processes, performs the computationally intensive tasks. For example, the disclosed network system 100 might use a deep learning model of the intelligence server 138 to perform object detection on image data, identifying and classifying various objects in real-time. It could then employ a separate computing process to analyze the movement and behavior of objects, recognizing complex interactions or anomalies. In some cases, the intelligence server 138 may combine data from multiple sensors 110 and can fuse a thermal image with a visual one to more accurately identify an object or use LiDAR data to provide precise spatial context to a 2D image. This integrated approach allows the network system 100 to extract a more comprehensive and nuanced understanding of the scene than would be possible with a single processing method, enabling a wide range of applications from security and surveillance to autonomous navigation and environmental monitoring.

It is appreciated that the one or more sensors 110 can comprise one or more visual sensors, audio sensors, touch sensors, radar sensors, LiDAR sensors, GPS sensors, vehicle telemetry sensors, specialized weather sensors, heat or thermal imaging sensors, 3D imaging sensors, AR sensors, VR sensors, and/or chemical sensors.

In some embodiments, the one or more sensors 110 can comprise visual sensors. These sensors may include any device or system capable of capturing, detecting, or measuring visual information from a monitored field. These devices or systems may include cameras, Closed-Circuit Television (CCTV) systems, imaging systems associated with or coupled to an unmanned aerial vehicle (UAV), emotion-optimized cameras, photodetectors, image sensors, satellite imaging sensors, and/or other optical devices. For example, the visual sensors may be configured to acquire visual data, which enables the identification, analysis, and monitoring of objects and environments in real time.

Furthermore, the one or more visual sensors may work with, or have integrated within their hardware setup, various illumination systems to optimize data capture, extending the one or more visual sensors capabilities far beyond standard daylight conditions. These illumination systems, which can be positioned proximally (e.g., a built-in flash on a camera) or distal (e.g., a high-powered floodlight or infrared emitter), work in tandem with the one or more visual sensors to improve the quality and utility of the acquired visual data.

The illumination systems referenced herein can encompass a wide range of technologies, each serving a specific purpose. For visible light imaging, active illumination like high-intensity LEDs or floodlights can be used to brighten a scene, ensuring clear and well-shown images even in low-light conditions. These systems can be static or dynamic, adjusting their intensity based on the ambient light or focusing on a specific area of interest. For example, a streetlamp-style distal illuminator can provide broad coverage for a public space, while a proximal illuminator on a camera can provide a burst of light for a quick snapshot.

Expanding beyond the visible spectrum, the one or more visual sensors can have attendant infrared (IR) illumination systems, which are crucial for night vision and covert surveillance. These systems can emit IR light, which is invisible to the human eye but detectable by IR-sensitive cameras. This allows the one or more visual sensors to capture detailed images in complete darkness without alerting an imaged object (e.g., a vehicle) in the visual data to its presence. For example, these sensors can be configured for security applications or wildlife monitoring.

Furthermore, the one or more sensors 110 can incorporate other advanced illumination and sensing techniques. Thermal imaging sensors can be used in conjunction with the one or more visual sensors that highlight heat signatures, allowing for the detection of an object (e.g., a vehicle) even through smoke, fog, or camouflage. In some cases, thermal imaging sensors can beneficially enable search and rescue operations or identifying objects (e.g., a vehicle) in a chaotic environment.

In some instances, the one or more sensors 110 can comprise audio sensors. These sensors may include any device or system capable of detecting, capturing, or measuring sound waves or acoustic signals within a monitored environment. These devices or systems may include one or more of microphones, acoustic transducers, acoustic sensors, and/or ultrasonic detectors. For example, the sensors may be configured to identify, classify, and/or analyze sounds associated with objects, vehicles, and/or environmental conditions, and may be deployed in static or dynamic configurations to support a wide range of applications, including monitoring, diagnostics, and situational awareness.

In some embodiments, the one or more sensors 110 may comprise touch sensors. These sensors may include any device or system capable of measuring physical contact, pressure, or tactile input within a monitored environment. These devices or systems may incorporate one or more of capacitive, resistive, piezoelectric, and/or mechanical sensing elements. For example, touch sensors may be configured to detect and analyze physical interactions (e.g., a driver's hands on a steering wheel), which enhances monitoring, control, and operational diagnostics. It is appreciated that a touch sensor may comprise a privacy preserving floor sensor.

In some cases, the one or more sensors 110 may comprise radar sensors. These sensors may include any device capable of emitting electromagnetic waves and detecting their reflections to determine the presence, distance, speed, or movement of objects within a monitored area. These sensors may operate across various frequency bands and may be used for object detection, collision avoidance, or environmental mapping in both static and dynamic scenarios. Like the thermal imaging sensors above, radar sensors are especially useful in identifying an object in a chaotic environment.

In some embodiments, the one or more sensors 110 may comprise light detection and ranging, or LiDAR, sensors. These sensors may include any device configured to emit laser pulses and measure the reflected signals to generate spatial data, such as distance, shape, or surface characteristics of objects. LiDAR sensors may be utilized for three-dimensional mapping, object recognition, or environmental analysis, and may be deployed in fixed or mobile configurations. In some cases, LiDAR sensors beneficially provide precise spatial measurements and three-dimensional mapping (e.g., the curvature of a road), which are essential for object recognition and environmental analysis.

In some instances, the one or more sensors 110 may comprise global positioning system, or GPS, sensors. These sensors may include any device capable of receiving signals from global positioning satellites to determine geographic location, velocity, or timing information. Such devices may be integrated within vehicles or other platforms to provide real-time positioning data for navigation, tracking, or operational analysis. For example, the GPS sensors may be configured to determine an object's location (e.g., the location of a vehicle on a road).

In some cases, the one or more sensors 110 may comprise vehicle telemetry sensors. These sensors may include any device or system configured to monitor, record, or transmit data related to vehicle operation, performance, or status. This may include sensors for speed, acceleration, or braking (e.g., accelerometer), engine parameters, fuel consumption, or other operational metrics, and may support remote or local data acquisition. In some cases, the vehicle telemetry sensors may beneficially enable monitoring and transmitting data about a vehicle's proximity and relationship to other objects (e.g., another vehicle).

In some embodiments, the one or more sensors 110 may comprise specialized weather sensors. These sensors may include any device designed to detect, measure, or monitor environmental conditions such as temperature, humidity, precipitation, wind speed, atmospheric pressure, or other weather-related parameters. For example, specialized weather sensors may be configured to enhance situational awareness or inform operational decisions within the network system 100.

In some instances, the one or more sensors 110 may comprise heat or thermal imaging sensors. These sensors may include any device capable of detecting or measuring thermal energy or temperature variations within a monitored area. These sensors may utilize infrared, thermocouple, or other technologies to identify heat signatures, support object detection, or enable other types of environmental monitoring under various conditions.

In some cases, the one or more sensors 110 may comprise 3D imaging sensors. These sensors may include any device or system capable of capturing three-dimensional spatial data, including but not limited to stereoscopic cameras, structured light sensors, or time-of-flight sensors. In some cases, the 3D imaging sensors beneficially enable mapping of three-dimensional spaces (e.g., the curvature of a road), enabling advanced recognition, reconstruction, and analysis of objects and scenes.

In some embodiments, the one or more sensors 110 may comprise augmented reality (AR) sensors. These sensors may include any device or system capable of capturing, detecting, or measuring data that enables the overlay of digital information onto a physical environment. These devices or systems may comprise cameras, depth sensors, inertial measurement units (IUWs), and environmental sensors.

In some instances, the one or more sensors 110 may comprise virtual reality (VR) sensors. These sensors may include any device or system capable of capturing, detecting, or measuring data that enables the creation or manipulation of immersive digital environments. These devices or systems may comprise motion tracking sensors, gyroscopes, accelerometers, haptic feedback devices, and spatial mapping sensors. For example, the virtual reality sensors may be configured for monitoring user movements, gestures, and interactions.

In some cases, the one or more sensors 110 may comprise chemical sensors. These sensors may include any device or system capable of detecting, capturing, or measuring the presence, concentration, or composition of chemical substances within a monitored environment. These devices or systems may comprise smoke, electrochemical, optical, semiconductor, gas, and biological sensors. For example, the chemical sensors may be configured for detecting and analyzing chemical substances in an event venue or on a public road.

The different embodiments of the one or more sensors 110 disclosed herein are exemplary embodiments only.

The raw data from the one or more sensors 110 can comprise a substantially real-time data and may be subjected to a series of data conditioning including sophisticated signal processing and image optimization operations within the analytics server system 105 and/or the intelligence server 138. This step beneficially refines the raw data before it is analyzed.

A relevant process comprised in the data conditioning is noise reduction, which filters out random fluctuations in the raw data caused by, for example, low light or high sensor gain. Computing processes such as spatial and temporal filtering can be applied to create a cleaner image with less grain, improving the accuracy of subsequent AI and ML operations. For visual data captured with IR illumination, specialized algorithms can enhance the contrast and detail of heat signatures, making it easier to classify and identify objects.

In addition, the data conditioning phase may employ advanced computational photography techniques. This can include High Dynamic Range (HDR) imaging, where multiple images of a given scene (e.g., a captured view by the one or more sensors 110) are captured at different exposures and then combined to create a single image with detail in both the brightest and darkest areas. Additionally, image stitching can be used to combine multiple images from different sensors comprised in the one or more sensors into a single, comprehensive view of the scene, providing a wider field of view. The intelligence server 138 can also apply real-time image enhancement and sharpening filters to make the raw data more suitable for specific analytical tasks, such as facial recognition or object tracking, ensuring that every piece of data is optimized for its intended purpose.

The operational nature of the sensors 110 may vary, encompassing static and dynamic implementations. In some embodiments, the sensors 110 may be static, fitted to a fixed structure and secured to prevent any movement, such as a sensor permanently bolted to an elongated frame to monitor a given area on a roadway. Other static sensors may be fitted to a fixed structure but secured in a way that allows for movement. One such sensor may be a pan-tilt-zoom (PTZ) camera mounted on the exterior of a given area that can be remotely controlled to observe various angles of said area or follow objects of interest. In further embodiments, the sensors 110 may be dynamic, fitted to moving platforms or vehicles. Examples of such dynamic sensors include those mounted on unmanned aerial vehicles (drones), inspection sensors affixed to autonomous delivery robots or other vehicles in a given location, or sensors integrated into vehicles.

In an exemplary implementation, the one or more sensors 110 (e.g., image capture sensors) comprise synchronized or unsynchronized cameras with or without an overlapping field of view. For example, the synchronized or unsynchronized cameras may be configured to monitor an area of a roadway including or excluding a lane of the roadway that is divided into n-regions with each region being monitored by one or more synchronized or unsynchronized cameras. Furthermore, each of the synchronized or unsynchronized cameras can comprise a high-angle camera configured to provide a clear view of an object (e.g., a vehicle) in its field of view such that images of the object can be analyzed from an optimal perspective. In addition, the disclosed one or more sensors 110 may be configured to implement occlusion mitigation computing operations that correct, compensate, or mitigate against negative effects of undesirable objects blocking the field of view of said one or more sensors.

It is appreciated that the one or more endpoint devices 125*a* . . . 125*n* can comprise handheld computing devices, smart phones, tablets, phablets, laptop computers, desktop computers, personal digital assistants (PDAs), smart devices, wearable electronic devices, biometric devices, computer servers, virtual servers, virtual machines, and/or communication servers. In some embodiments, the one or more endpoint devices 125*a* . . . 125*n* may include a plurality of computing devices configured to communicate with one another and/or receive/transmit data communications from/to the analytics server system 105 and/or the intelligence server 138. In some instances, one or more alert data communications (e.g., the aforementioned alerts) associated with executing one or more of the disclosed methods may be visualized on one or more display devices of the one or more endpoint devices 125*a* . . . 125*n*. In some cases, the one or more endpoint devices comprise a first endpoint device that is associated with the analytics server system 105. This first endpoint device, for example, can comprise an admin endpoint device configured to monitor, control, or otherwise regulate or validate various computing operations implemented in the network system 100. Furthermore, the one or more endpoint devices 125*a* . . . 125*n* can include a second endpoint device that may be dependent or independent from the analytics server system 105. This second endpoint point device, for example, may be associated with a security or monitoring system configured to support or implement security operations or vehicular traffic management based on analyzing captured image data. It is also appreciated that the one or more endpoint devices 125*a* . . . 125*n* may include and/or are associated with the one or more sensors 110.

The output system 120 of FIG. 1, is adaptable to interface with, and drive one or more sensor interfaces using data or control logic that may be either dependent on or independent of the computing operations performed by the disclosed methods and systems. For example, the output system 120 may incorporate a visual subsystem, such as a graphical display computing device including but not limited to liquid crystal displays (LCDs), light-emitting diode (LED) displays, organic light-emitting diode (OLED) displays, or touchscreen interfaces, configured to render data alerts, notifications, graphical representations, or other electronic indicia derived from or responsive to the outcomes of the disclosed computing operations. Additionally, the output system 120 may integrate an audio subsystem, exemplified by speakers, transducers, or audio amplifiers, capable of generating audio data such as tones, voice prompts, or synthesized speech in response to input data or control logic stemming from, or independent of the disclosed methods. Furthermore, the output system 120 can encompass vibration-based mechanisms, such as eccentric rotating mass (ERM) motors or linear resonant actuators (LRAs), embedded within various apparatuses including automotive steering wheels, handheld mobile computing devices, wearable electronic watches, or tablet computing devices, to deliver tactile alerts or feedback patterns triggered by processed data or logic resulting from one or more of the disclosed methods.

In some embodiments, the output system 120 is configured to activate a haptic feedback subsystem, employing vibration sensors, piezoelectric elements, or similar haptic actuators to provide nuanced tactile sensations, such as variable intensity vibrations or directional cues, in response to data or control logic generated post-execution of one or more of disclosed methods. Moreover, the output system 120 may include embedded control logic designed to regulate environmental conditioning systems, thereby modulating parameters like ambient temperature via heating or cooling elements, atmospheric pressure through pressurization valves or compressors, or humidity levels using humidifiers, dehumidifiers, or evaporative systems, all in accordance with the computational results or directives associated with the disclosed methods and systems. Additionally, the output system 120 can incorporate control logic for operating a radio transmitter, facilitating the transmission of electrical or electromagnetic data—such as processed sensor readings, analytical insights, or command signals—to key interconnected systems depicted in FIG. 1, including but not limited to the analytics server 105, the intelligence server 138, and the endpoint devices 125*a* . . . 125*n* via protocols such as Wi-Fi, Bluetooth, cellular networks, or other wireless and/or wired communication standards.

In some embodiments, the output system 120 may be comprised in, or associated with one or more of the analytics server 105, the intelligence server 138, and the endpoint devices 125*a* . . . 125*n*. In some cases, the output system 120 is proximal to one or more of analytics server 105, the intelligence server 138, and the endpoint devices 125*a* . . . 125*n*. For example, the output system may be comprised in, for example, a vehicle associated with the analytics server 105, the intelligence server 138, and the endpoint devices 125*a* . . . 125*n*.

System Environment

FIGS. 2 and 3 illustrate exemplary system and functional diagrams of a computing environment 200, within which one or more systems shown in FIG. 1 can be implemented. Specifically, FIG. 2 provides a system diagram of the computing environment, whereas FIG. 3 provides a detailed functional diagram of the computing environment 200.

The computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 115 of FIG. 1. The computing environment 200 may be implemented on general-purpose hardware and/or specifically-purposed hardware as the case may require.

The processing unit 202 may control one or more of the memory unit(s) 204, the I/O unit 206, and the communication unit 208 of the computing environment 200, as well as any included subunits, elements, components, devices, and/or functions performed by the memory unit 204, I/O unit 206, and the communication unit 208. The described subelements of the computing environment 200 may also be included in similar fashion in any of the other units and/or devices included in the network system 100 of FIG. 1. Additionally, any actions described as being performed by a processor may be executed by the processing unit 202 of FIG. 2 alone and/or by the processing unit 202 in conjunction with one or more additional processors, units, subunits, elements, components, devices, and/or the like. For example, the processing unit 202 may be configured to implement computing instructions that process or otherwise analyze received image, video, or other data from the one or more sensors discussed above.

Further, while one processing unit 202 may be shown in FIG. 2, multiple processing units may be present and/or otherwise included in the computing environment 200 or elsewhere in the network system 100 of FIG. 1. Thus, while instructions may be described as being executed by the processing unit 202 (and/or various subunits of the processing unit 202), the instructions may be executed simultaneously, serially, and/or otherwise by one or multiple processing units 202 on one or more computing devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, image content, video content, textual content, audio-visual content, or any combination thereof. In some instances, content on which the content management unit 212 may operate includes device information, user interface data, images, text, themes, audio files, video files, documents, and/or the like. Additionally, the content management unit 212 may control (e.g., format) the audio-visual environment and/or appearance of application data during execution of various processes. In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information. The location determination unit 214 may be associated with the one or more sensors 110, discussed above.

The GPU 216 may facilitate generation, modification, analysis, processing, transmission, and/or presentation of content described above, as well as any data such as pipeline data or analysis data or other output data generated using at least a file and/or the like. In some embodiments, the GPU 216 may be used to render content for presentation on a computing device via, for example, a graphical display computing device or a graphical user interface (GUI) of a display device of the endpoint device 125*a*. The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operations within the computing environment 200. In one embodiment, the memory unit 204 stores instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself. Moreover, the memory unit may store code for implementing the data unit 136 associated with the analytics server system 105. Furthermore, the memory unit 204 can also be used to store one or more computing models, relationship record(s) associated with category data determined during, for example, classification computing operations executed on a captured substantially real-time data using the one or more sensors. The category data, for example, can be linked to, or characterize features of objects imaged using the one or more sensors.

Turning back to FIGS. 2 and 3, the memory unit 204 may include various types of data storage media such as solid-state storage media, hard disk storage media, virtual storage media, and/or the like. Memory unit 204 may include dedicated hardware elements such as hard drives and/or servers, as well as software elements such as cloud-based storage drives. In some implementations, memory unit 204 may include a random-access memory (RAM) device, a dynamic random-access memory (DRAM) device, a static random-access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described in this disclosure. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 includes one or more databases 210 for storing any data described herein. For example, depending on the implementation, the one or more databases 210 may be used as the local computing database 111*a* or remote computing database 111*b* associated with the analytics server system 105. In some embodiments, the memory unit 204 and/or its subunits may be local relative to the analytics server system 105 and/or be remotely located relative to the analytics server system 105.

The memory unit 204 may include subunits such as an operating system unit 226, an application data unit 228, an application programming interface (API) unit 230, a content storage unit 232, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include the data unit 136 and the intelligence unit 140. The data unit 136 and/or intelligence unit 140 may be configured to implement one or more of the disclosed computing methods or operations. According to one embodiment, the data unit 136 and/or the intelligence unit 140 comprise one or more of a analytic data flux processor (ADFP), a cognitive data orchestration unit (CDOU), an insight generation hypervisor (IGH), a metric derivation computational fabric (MDCF), a phenomenological data synthesizer (PDS), a quantitative intelligence abstraction engine (QIAE), an adaptive data analytics core (ADAC), a contextual insight graph engine (CIGE), an empirical data transformation array (EDTA), or a heuristic data pattern extractor (HDPE).

The operating system unit 226 may facilitate deployment, storage, access, execution, and/or utilization of an operating system used by computing environment 200 and/or any other computing environment described in this disclosure. In some embodiments, operating system unit 226 may include various hardware and/or software elements that serve as a structural platform for the processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, an endpoint device (e.g., endpoint device 125*a*) may be required to download, install, access, and/or otherwise use a software application (e.g., web application) to facilitate performance of one or more of the disclosed computing operations. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or use of information associated with APIs of computing environment 200 and/or any other computing environment described in this disclosure. For example, computing environment 200 may include one or more APIs for various devices, applications, units, subunits, elements, and/or other computing environments to communicate with each other and/or use the same data. Accordingly, API unit 230 may include API databases containing information that may be accessed and/or used by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the analytics server system 105 and/or the display device of the endpoint device 125*a* to communicate with each other.

The content storage unit 232 may facilitate deployment, storage, access, and/or utilization of information associated with performance of the disclosed operations by computing environment 200 and/or any other computing environment described. In some embodiments, content storage unit 232 may communicate with content management unit 212 to receive and/or transmit content files (e.g., media content, image data, video data, audio-visual data, visualization data, etc.).

The cache storage unit 240 may facilitate short-term deployment, storage, access, analysis, and/or use of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing processes described herein. For example, elements of the I/O unit 206 may be used to receive input from the analytics server system 105. As described, I/O unit 206 may include subunits such as an I/O device 242, an I/O calibration unit 244, and/or driver 246.

The I/O device 242 may facilitate receipt, transmission, processing, presentation, display, input, and/or output of information as a result of executed processes described in this disclosure. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally, and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute the disclosed operations.

The I/O calibration unit 244 may facilitate the calibration of the I/O device 242. For example, I/O calibration unit 244 may detect and/or determine one or more settings of I/O device 242 and then adjust and/or modify settings and/or format and/or optimize viewing of a graphical user interface and/or one or more visualizations associated with alerts or alert data communications. According to some embodiments, the I/O calibration unit 244 may be used to format or resolve, for example, data communications such as alerts or data reports into multidimensional data components (e.g., multi-modal data including multiple aspects such as image data, video data, textual data, etc.) and rendering the multidimensional data components on a display device.

In some embodiments, the I/O calibration unit 244 may use a driver 246 (or multiple drivers) to calibrate I/O device 242. For example, driver 246 may include software that is installed by I/O calibration unit 244 so that an element of computing environment 200 (or an element of another computing environment) may recognize and/or integrate with I/O device 242 for disclosed processes.

The communication unit 208 may facilitate establishment, maintenance, monitoring, and/or termination of data communications (e.g., control or alert data communications) between computing environment 200 and other computing environments, third party server systems, and/or the like. Communication unit 208 may also facilitate internal communications between various elements (e.g., units and/or subunits) of computing environment 200. For example, the communication unit 208 may be configured to receive substantially real-time data from one or more of the one or more sensors 110 as well as coordinate the transmission and/or storage of any attendant data such as analysis reports associated with analyzing the substantially real-time data, instructions and/or data to the one or more output systems 120, and/or any alerts to stakeholders with one or more endpoint devices. In some embodiments, communication unit 208 may include a network protocol unit 248, an API gateway 250, an encryption unit 252, and/or a communication device 254. Communication unit 208 may include hardware and/or software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing the disclosed methods and/or data visualization operations and/or other processes provided in this disclosure.

The API gateway 250 may allow other devices and/or computing environments to access API unit 230 of memory unit 204 of computing environment 200. For example, display devices associated with the various systems of FIG. 1 may access API unit 230 of computing environment 200 via API gateway 250. In some embodiments, API gateway 250 may be required to validate user credentials associated with a user of a display device prior to providing access to API unit 230 to a user. API gateway 250 may include instructions for computing environment 200 to communicate with another device and/or between elements of the computing environment 200.

The encryption unit 252 may facilitate translation, encryption, encoding, decryption, and/or decoding of information received, transmitted, and/or stored by the computing environment 200. Using encryption unit 252, each transmission of data may be encrypted, encoded, and/or translated for security reasons, and any received data may be encrypted, encoded, and/or translated prior to its processing and/or storage. In some embodiments, encryption unit 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Figure 4:
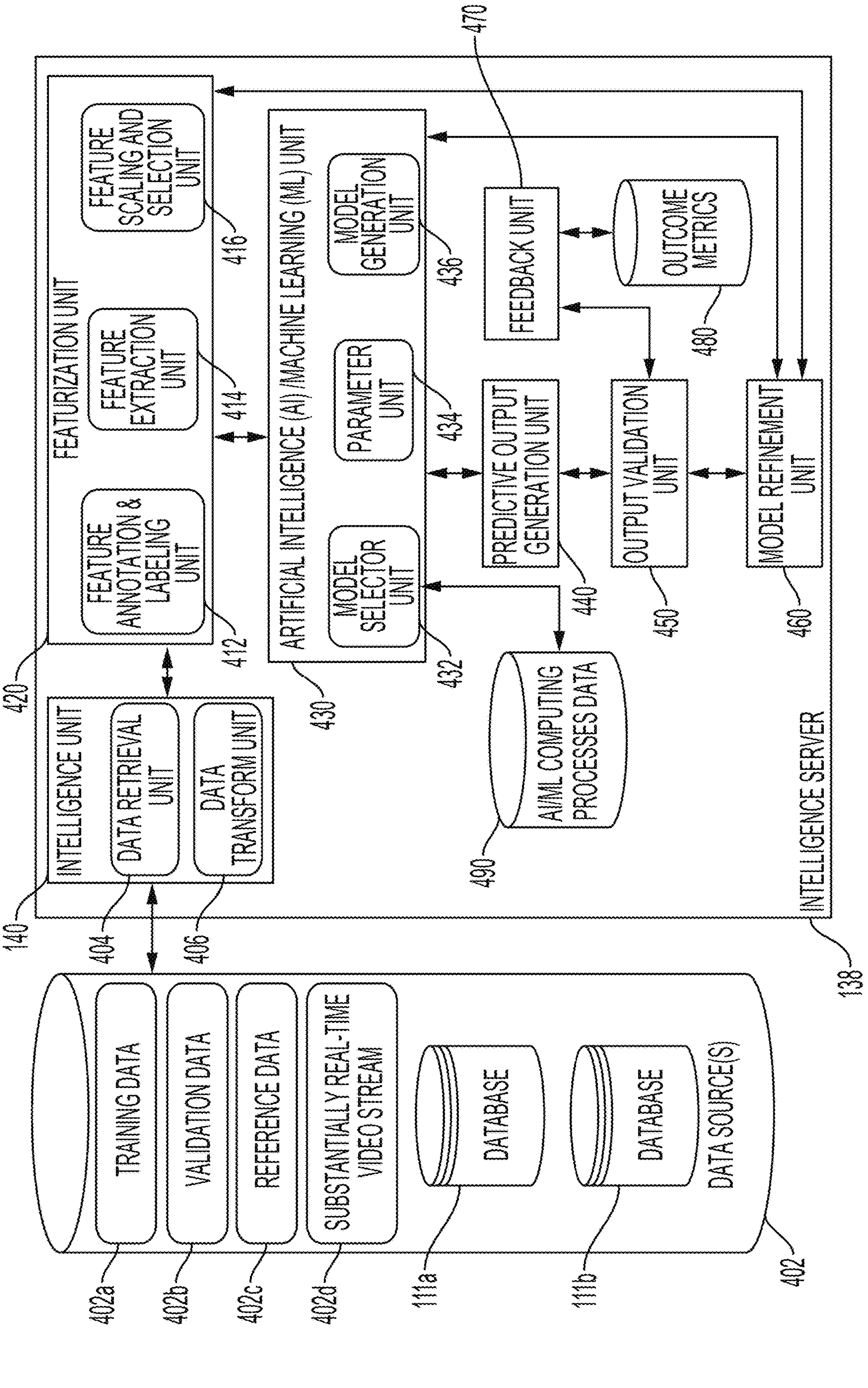
FIG. 4 shows an exemplary communicative coupling of the intelligence server 138 to one or more data sources.

FIG. 4 shows an exemplary communicative coupling of the intelligence server 138 to one or more data sources. In the illustrated implementation, the intelligence server 138 comprises the above-referenced intelligence unit 140 that can include a data retrieval unit 404 and data transform unit 406. Data retrieval unit 404 may be configured to access, assess, interpret, request, or receive data, which may be adjusted, reformatted, or changed. For example, data retrieval unit 404 may request data from a remote source (e.g., data from the one or more sensors 110 and/or databases 111*a* and 111*b* of the analytics server system 105) using an API. Thus, the intelligence unit 140 may be configured to access, interpret, request, format, re-format, or receive input data from the one or more data sources outlined in data source(s) 402. For example, intelligence unit 140 may be configured to use data transform unit 406 to execute a re-configuration or other data changes or data transformations, such as a data dimension reduction prior to the analytics server 105 running intelligence computing operations on said transformed data. Data source(s) 402 may comprise real-time or near real-time captured data that is stored on one or more memories devices such as those discussed in association with FIGS. 2 and 3. In some embodiments, data source(s) 402 may be associated with a single entity (e.g., a single computing network) or with multiple entities (e.g., multiple computing networks). Data source(s) 402 may include one or more of training data 402*a* (e.g., input data to feed a machine learning model as part of one or more training processes), validation data 402*b* (e.g., data against which at least one processor may compare model output with, such as to determine model output quality), reference data 402*c*, and/or a substantially real-time video stream 402*d*. In some embodiments, intelligence unit 140 can be implemented using at least one computing device. For example, data from data sources 402 can be obtained through one or more I/O devices and/or network interfaces. Further, the received data may be stored (e.g., during execution of one or more operations) in a suitable storage or system memory. Intelligence unit 140 may also be configured to interact with a memory unit (e.g., memory unit 204), which may be implemented on a computing device that stores data in a storage device.

In some embodiments, intelligence unit 140 comprises an executable software module containing one or more instructions or computer-executable logic. These instructions are specifically configured to be executed by one or more processors, such as the processors discussed in association with FIGS. 2 and 3, to perform computing operations of the intelligence server 138 including coordinating with the various units of the intelligence server 138 to perform intelligent computing operations.

The intelligence server 138 may also include machine learning (ML) modeling unit 430, which may be configured to execute one or more modeling computing operations on an AI or ML model (e.g., model training, model re-configuration, model validation, model testing), such as those described in the processes described herein. For example, the ML modeling unit 430 may execute an operation to train an AI or ML model, such as adding, removing, or modifying a model parameter. Training of an AI or ML model may be supervised, semi-supervised, or unsupervised. In some embodiments, training of an AI or ML model may include multiple epochs, or passes of data (e.g., training data 402*a*) through an AI or ML model process (e.g., a training process). In some embodiments, different epochs may have different degrees of supervision (e.g., supervised, semi-supervised, or unsupervised).

Training data for a given AI or ML model under consideration may include input data (e.g., as described above) and/or data previously output from a model (e.g., forming recursive learning feedback). A model parameter may include one or more of a seed value, a model node, a model layer, a computing process, a function, a model connection (e.g., between other model parameters or between models), a model constraint, or any other digital component influencing the output of a model. A model connection may include or represent a relationship between model parameters and/or disparate models, which may be dependent or interdependent, hierarchical, and/or static or dynamic. The combination and configuration of the model parameters and relationships between model parameters discussed herein can be cognitively infeasible for the human mind to maintain or use. Without limiting the disclosed embodiments in any way, an ML or AI model may include millions, trillions, or even billions of model parameters.

ML modeling unit 430 may include model selector unit 432 (e.g., configured to select a model from among a plurality of models, such as based on input data), parameter selector unit 434 (e.g., configured to add, remove, and/or change one or more parameters of a model), and/or model generation unit 436 (e.g., configured to generate one or more machine learning models, such as according to model input data, model output data, comparison data, and/or validation data). In some embodiments, model selector unit 432 may be configured to receive input and/or transmit output to AI/ML computing processes database 490. AI/ML computing processes database 490 may store one or more AI/ML models, any of which may be fully trained, partially trained, or untrained. In one embodiment, an AI/ML model may be, or include, without limitation, one or more of (e.g., such as in the case of a metamodel) a statistical model, a complex computing process, a neural network (NN), a convolutional neural network (CNN), a generative neural network (GNN), a Word2Vec model, a bag of words model, a term frequency-inverse document frequency model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, a You Only Look Once (YOLO) computing model. A YOLO model, for example, can be used to efficiently detect and bound an object within the image data using, for example, a bounding box. Further, each of the bounding boxes for a detected object may comprise minimum coordinates and maximum coordinates. The minimum and maximum coordinates can represent the coordinates of two diagonally opposite corners of a given bounding box. In one embodiment, the minimum coordinates can correspond to the top-left corner of the bounding box, while the maximum coordinates correspond to the bottom-right corner of the bounding box. Furthermore, the intelligence server 138 may be configured to measure the relative angle between the two bounding boxes associated with a given image data and thereby track the movement of the vehicles on a roadway. The relative angle may be generated using a straight line connecting either the minimum coordinates or the maximum coordinates of the two bounding boxes.

By processing images in real-time using the disclosed models, the disclosed system becomes a high-accuracy vehicle detection system, making it suitable for applications such as real-time traffic monitoring. Other intelligent computing processes such as SSD (Single Shot MultiBox Detector) computing processes, Faster R-CNN computing processes, RetinaNet computing processes, and the like can be employed for the vehicles detection and bounding, to efficiently track the movement of the vehicles on the roadway.

Intelligence server 138 can further include predictive output generation unit 440, output validation unit 450 (e.g., configured to apply validation data to machine learning model output), feedback unit 470 (e.g., configured to apply feedback to a model), and model refinement unit 460 (e.g., configured to update or re-configure a model). In some embodiments, feedback unit 470 may receive input and/or transmit output (e.g., output from a trained, partially trained, or untrained model) to outcome metrics database 480. Outcome metrics database 480 may be configured to store output from one or more models and may also be configured to associate output with one or more models. In some embodiments, outcome metrics database 480, or other device (e.g., model refinement unit 460 or feedback unit 470) may be configured to correlate output, detect trends in output data, and/or infer a change to input or model parameters to cause a particular model output or type of model output. In some embodiments, model refinement unit 460 may receive output from predictive output generation unit 440 or output validation unit 450. In some embodiments, model refinement unit 460 may transmit the received output to featurization unit 420 or ML modeling unit 430 in one or more iterative cycles.

Any or each unit of intelligence server 138 may comprise a computing unit or a data unit, which may be a packaged functional hardware unit designed for use with other components or a part of a program that implements specific computing operations. Any or each computing unit may be implemented using a computing environment such as those discussed in conjunction with FIGS. 2 and 3. In some embodiments, the functionality of intelligence server 138 may be split across multiple computing environments to allow for distributed processing of the data, which may improve output speed and reduce computational load on individual computing environments. In some embodiments, intelligence server 138 may use load-balancing to maintain stable resource loads (e.g., processing load, memory load, or bandwidth load) across multiple computing environments and to reduce the risk of a computing environment from becoming overloaded. In these or other embodiments, the different components may communicate over one or more I/O devices and/or network interfaces.

It is appreciated that the intelligence server 138 can beneficially facilitate implementing one or more computing operations associated with the network system 100 of FIG. 1. In effect, the intelligence server 138 provides the computational backbone for complex, single, or multi-stage intelligence computing processes. It is appreciated that the intelligence server 138 can ingest a substantially real-time data from multiple sensors which can be used in an object detection, and/or establishing data indicative of proximity and contact dynamics assessment between two objects (e.g., two vehicles), where an AI model of the intelligence server 138, identifies and draws a bounding box (e.g., a structure that can surround an object in an image) around each object (e.g., vehicles) comprised in the captured substantially real-time data. Following detection, the intelligence server 138 may perform various computing operations to classify consistent identifiers to each identified object in the substantially real-time data across successive image frames within a single view of one or more sensors 110. This addresses challenges like temporary occlusion, where an object is briefly hidden from view. The intelligence server 138's processing power and architecture enables these computationally intensive tasks to happen quickly and accurately, allowing for the classification and identification of objects on a roadway.

In some embodiments, the intelligence server 138 can analyze the spatial and temporal (e.g., spatiotemporal) relationships between an identified object (e.g., a vehicle) and other objects comprised in the data components of the substantially real-time data. This can involve a deeper layer of AI and/or ML computing operations to infer the nature of the object relationships in captured image data of a physical environment. This allows the intelligence server 138 to recognize and classify a wide range of objects in the physical environment, providing a nuanced understanding of a camera scene comprised in a substantially real-time image data by identifying not just what is present in the scene, but also what is happening within the scene.

EMBODIMENTS

Visitors to large and complex environments often experience difficulty locating destinations efficiently and confidently. Particularly, first-time visitors and diverse audiences for whom static signage and ad-hoc wayfinding are insufficient often struggle navigating new environments. These conditions lead to missed points of interest, congestion, and increased operational burden. The disclosed methods and systems address these challenges by transforming captured scans of a physical environment into interoperable maps that drive synchronized, role-appropriate mixed-reality experiences.

In representative implementations, scan data acquired by one or more scanning devices is processed to generate visual data (e.g., a visual map), collision data (e.g., a collision map), and feature data (e.g., a feature map), which are combined into spatial data (e.g., a spatial map) using a layered architecture organized as a first layer (e.g., a component spatial mapping & scanning layer 1), a second layer (e.g., a component map fusion layer 2), a third layer (e.g., a component data orchestration layer 3), and a fourth layer (e.g., a component experience enablement layer 4). According to one embodiment, the second layer aligns coordinate systems and pivots to harmonize map products; the third layer provides storage, indexing, and synchronized distribution; and the fourth layer presents computations associated with user experience via a content management interface and a mobile/headset client device.

This design provides several benefits. The modular processing pipelines disclosed support scalable deployment and adaptability across venues. For example: the fusion layer yields a unified and accurate digital representation of a given physical environment; and the experience-enablement layer delivers responsive, real-time updates to end users, improving wayfinding, discovery, and operational effectiveness across urban or non-urban locations such as airports and metro stations, retail and event spaces, industrial facilities, and educational or corporate campuses.

Unless stated otherwise, scanning devices perform acquisition, and the mixed reality device, the augmented reality device, and the mobile computing device consume the generated maps for visualization, navigation, and interaction. Where applicable, at least one intelligence model analyzes device-captured data to provide object metadata, location attributes, navigation rules, operational and environmental context, and user-tailored presentation that inform an interactive 3D representation of generated spatial data (e.g., the spatial map).

In some cases, coordinate systems and pivots associated with the disclosed visual data (e.g., visual map), the collision data (e.g., collision map), and the feature data (e.g., feature map) are aligned to a reference coordinate system before fusion to enable deterministic or non-deterministic overlay and interoperation across the data layers referenced above. This alignment anticipates the map-matching and fusion steps and stabilizes downstream rendering and interaction as users move through the environment.

According to one embodiment, the disclosed system includes a content management system (e.g., content management unit 212 of FIG. 2) that executes functions to access and visualize mapped spaces in real time and to deploy, modify, and categorize points of interest as navigation nodes, public service points, interactive points, commercial/marketing points, and customized nodes, with updates synchronized to client applications.

For outdoor or mixed indoor-outdoor deployments, the spatial data (e.g., the spatial map) generated based on the visual data, the collision data, and the feature data can be georeferenced to the Earth using geographic information system readings and/or visual-positioning-system readings to aid large-area alignment and consistency.

The disclosed system can also record quality measures and provenance with the visual map-such as coverage metrics, reprojection error statistics, alignment residuals relative to the collision map, and class-completeness measures for elements referenced in the feature map-so authoring and client logic can prioritize updates and rendering. These aspects are further explored in association with FIGS. 8A and 8B.

To support efficient delivery on end-user devices, the visual map can be segmented into streamable tiles or regions with metadata needed for a current viewpoint or task context.

Authoring updates are supported under intermittent connectivity: a web browser interface associated with the mobile computing device and a headset interface associated with the augmented reality device or the mixed reality device can cache local change sets against a pinned baseline and later reconcile them in a deterministic order when connectivity returns.

In addition to an author-oriented first library of data objects, a second library of data objects for end-user interaction can include lightweight markers, user-placeable location anchors, personalization overlays, quick-action regions, and temporal prompts, while enforcing role-appropriate scopes and preventing edits reserved to the first library.

Client applications can also render service availability at city scale, allowing users to explore where mapped services are currently provided on a two-dimensional city view.

Figure 5:
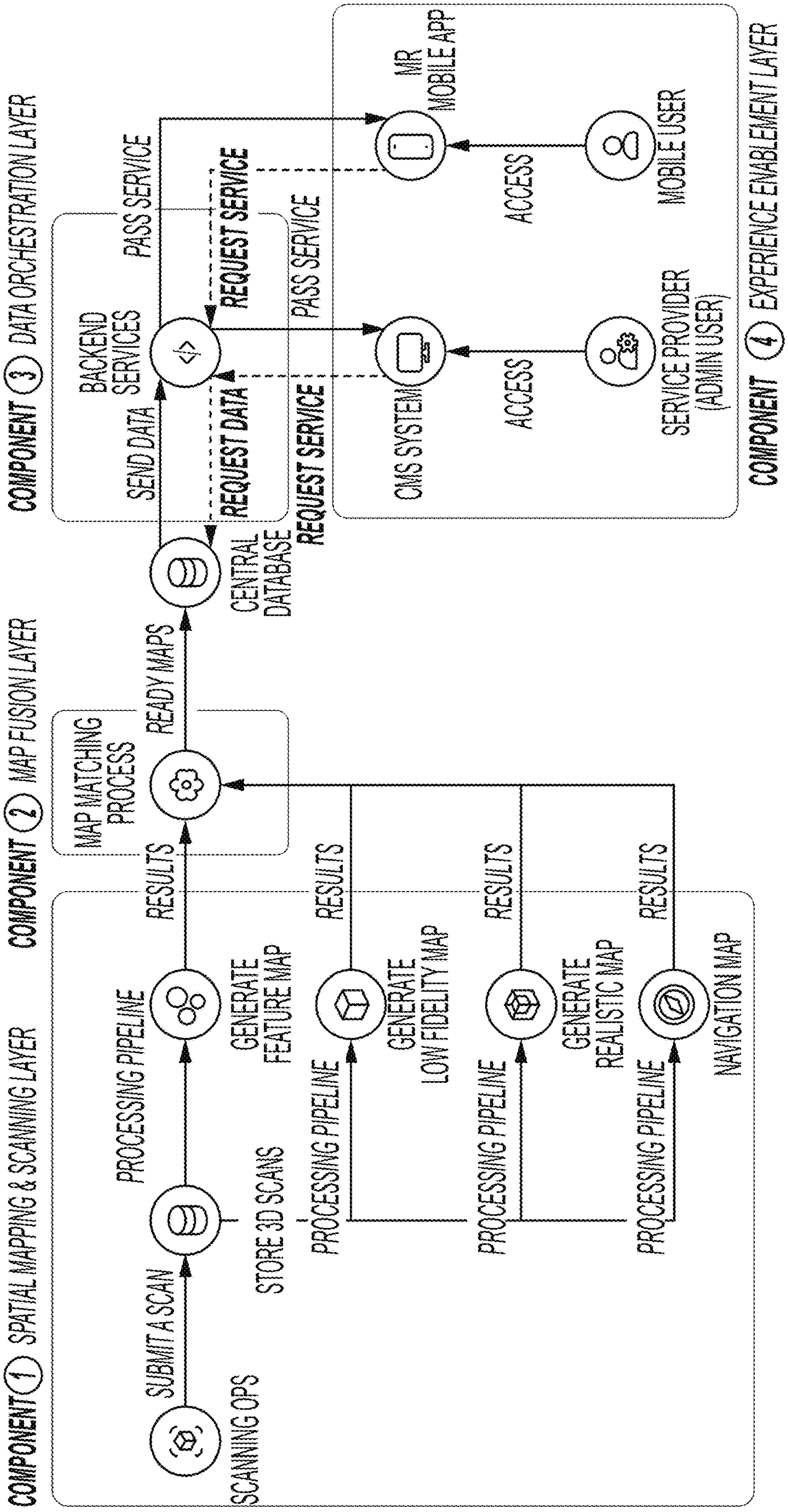
FIG. 5 illustrates an end-to-end system flow across multiple data processing layers associated with the disclosed spatial data generation and utilization.

FIG. 5 illustrates an end-to-end system flow across a first layer (e.g., a component spatial mapping & scanning layer 1), a second layer (e.g., a component map fusion layer 2), a third layer (e.g., a component data orchestration layer 3), and a fourth layer (e.g., a component experience enablement layer 4). In the first layer, the system receives a submit-a-scan event (e.g., submit a scan) through scanning ops, ingests captured input, and stores 3D scans (e.g., store 3D scans) for downstream processing. A processing pipeline (e.g., processing pipeline) within backend services can be used to perform a map-matching operation (e.g., map matching process) which generates individual map products, namely generate feature map, generate the collision map (e.g., based on the low fidelity map), and generate the visual map (e.g., realistic map). The pipeline stages outputs as ready maps (e.g., ready maps) in a central database (e.g., central database) and transmits result indicators (e.g., results) reflecting processing states. Service interfaces comprised in the disclosed systems can manage data requests (e.g., map request) so that data is delivered to the content management system (CMS system) and/or a mixed reality (MR) mobile app for an end user and/or a service provider (admin user), such that a spatial map including a navigation map is generated from fused data outputs for guidance. This flow corresponds to receiving first and second scan data, generating per-map products, and organizing them for composition into spatial data as described in the flowchart below.

During operation, the first layer performs acquisition and preparation of scan inputs; the second layer aligns and reconciles separate map products; the third layer provides storage, versioning, multi-tenant separation, and synchronized distribution; and the fourth layer renders and controls end-user and authoring experiences through the content management interface and client applications. This arrangement mirrors the disclosed components: a spatial mapping & scanning capability that yields distinct maps, a map-fusion capability that harmonizes geometry and appearance, a data-orchestration backbone that ensures consistent distribution, and an experience-enablement surface exposing a content management system and a mobile/headset client.

Figure 6A:
FIG. 6A shows exemplary feature data.
Figure 6B:
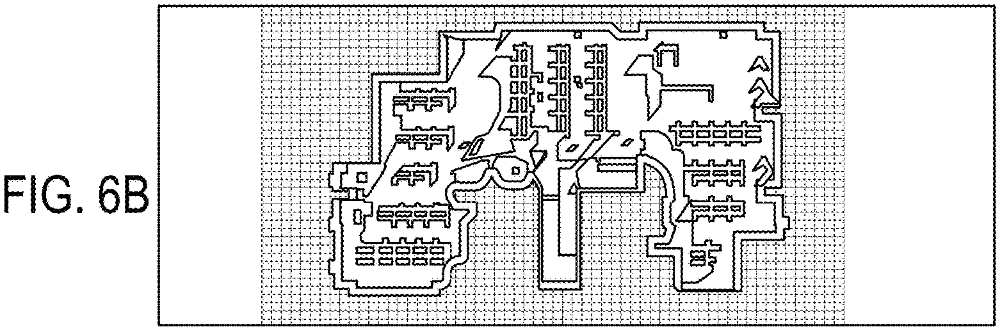
FIG. 6B shows exemplary collision data.
Figure 6C:
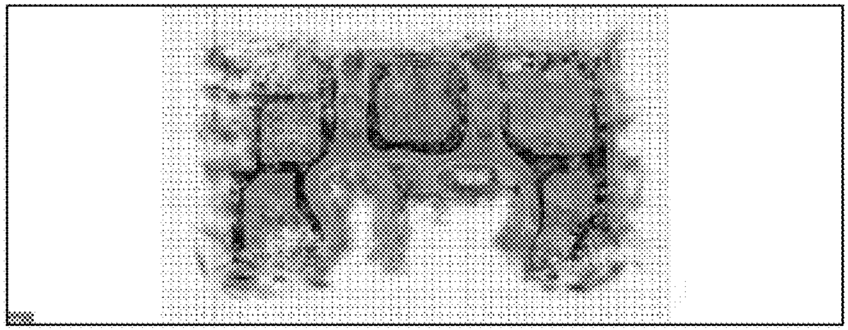
FIG. 6C shows exemplary visual data.
Figure 6D:
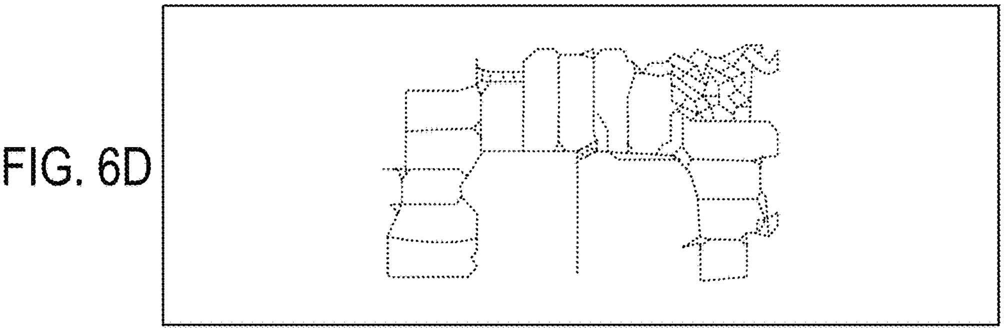
FIG. 6D shows exemplary navigation data based on at least the collision data.

FIGS. 6A-6D show exemplary data used in the second layer (e.g., a component map fusion layer 2). In particular, FIG. 6A shows feature data (e.g., feature map), FIG. 6B shows collision data (e.g., collision map), FIG. 6C indicates visual data (e.g., visual map) while FIG. 6D shows navigation data based on at least the collision data (e.g., collision map). According to one embodiment, the disclosed system performs feature correlation, geometric and visual alignment, and topological correlation to merge the foregoing data into a unified digital environment (e.g., spatial data) aligned to ground truth. From the fused topology, a navigation computing process, based on the unified digital environment, derives a navigation map using dynamic route graphs, contextual movement rules, adaptive pathfinding, and cross-level routing so that guidance data remain anchored to consistent spatial coordinates for client consumption. These fusion and routing operations align with composition of the spatial data (e.g., the spatial map) following generation of the visual, collision, and feature data.

Figure 7:
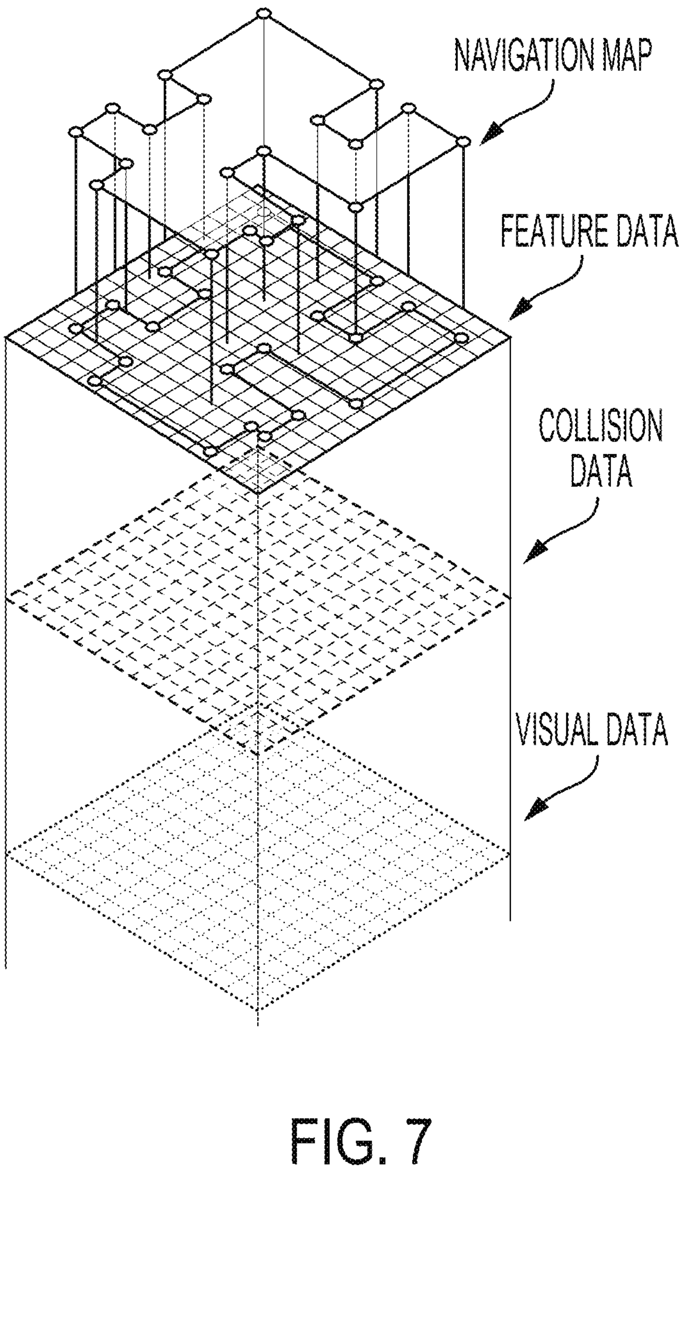
FIG. 7 shows an exemplary layering architecture of the various data comprised in the spatial data and their use.

FIG. 7 presents an exemplary layering architecture of the various data comprised in the spatial data and their use: feature data for anchoring and localization of objects in a physical environment, collision data for lightweight physics, testing, and previews, visual data for immersive visualization and object manipulation in the physical environment, and a navigation map (e.g., based on at least the collision data) for pathfinding and travel constraints. Each data may be produced by its own processing pipeline and persists as a distinct output available for fusion and delivery. It is appreciated that the coordinated use of the foregoing data/maps supports composition of spatial data (e.g., the spatial map) that enables 3D display on end-user devices, navigation using collision/navigation content, and object-centric updates guided by features.

In sum, these embodiments provide a clear, layered pathway from scan reception to fused, orchestrated, and experiential delivery of digital representations of a physical environment. In particular, the figure references in FIGS. 5-7 are associated with the flowchart of FIGS. 8A-8B.

Exemplary Workflow

Figure 8A:
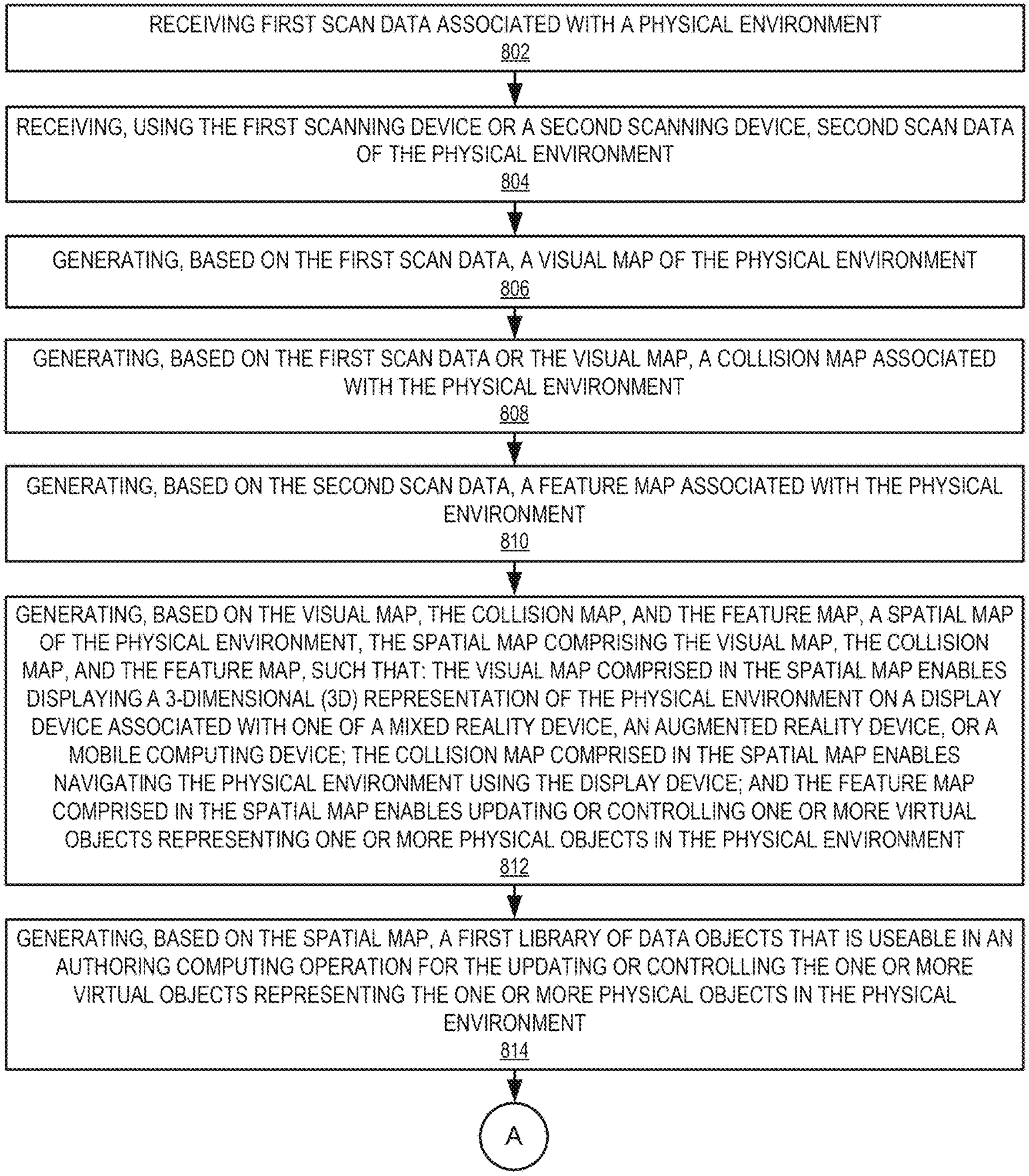
FIGS. 8A-8B illustrate an exemplary flowchart for rendering interactive spatial data representing a physical environment.
Figure 8B:
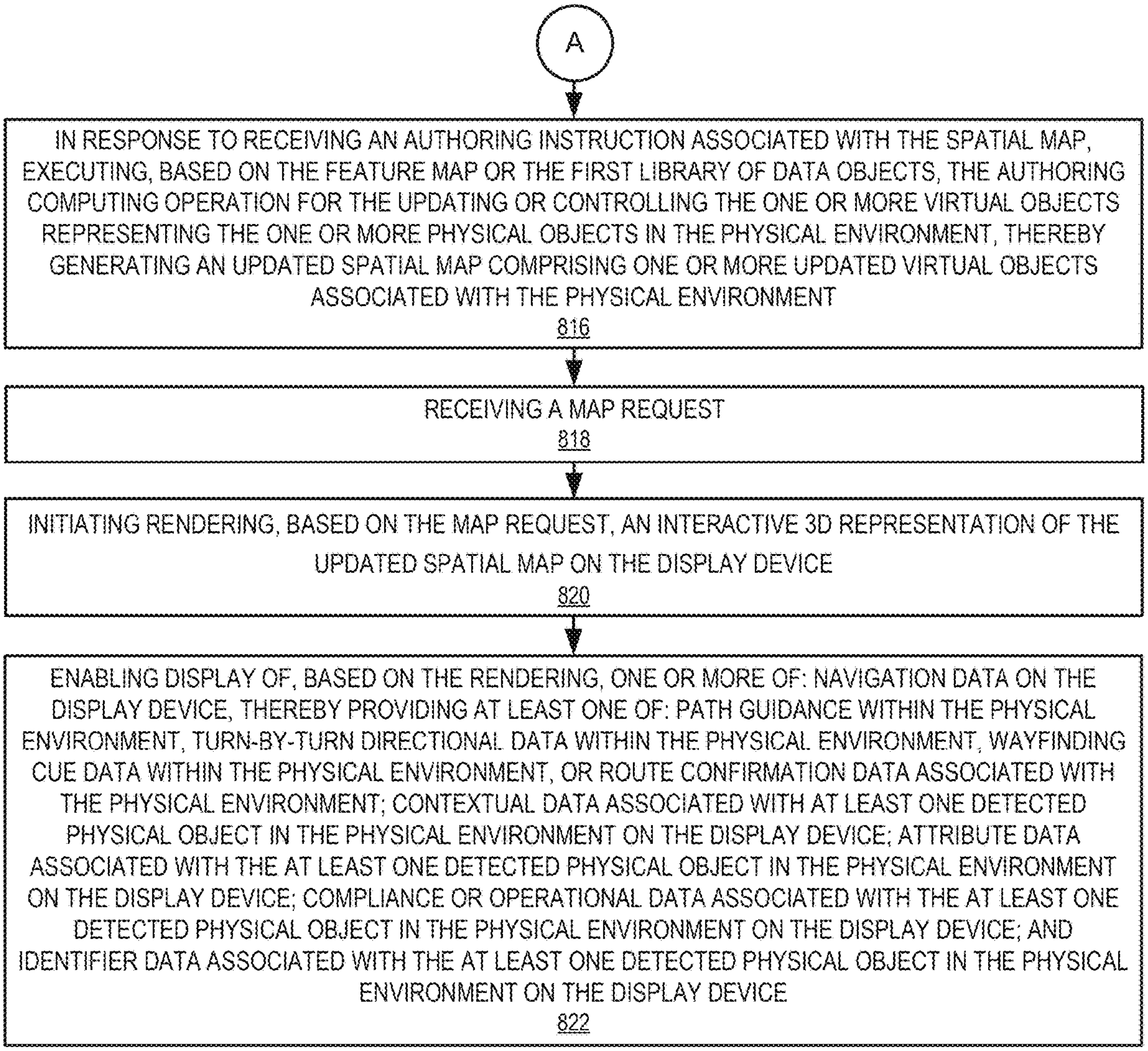

FIGS. 8A-8B illustrate an exemplary flowchart for rendering interactive spatial data representing a physical environment. In one embodiment, one or more data units, comprising control logic or applications stored in a non-transitory memory device, can enable the implementation of various processing stages within this flowchart. These data units can operate independently or in conjunction with a data communication and analysis software tool for transmitting and/or receiving and processing data (e.g., substantially real-time, or near real-time image data, spatial data, geolocation data, contextual data, etc.). Furthermore, the one or more data units may comprise one or more of the above-referenced data unit 136 and/or intelligence unit 140, which collectively facilitate data handling and intelligent analysis. In addition, the one or more data units may be associated with one or more computing device processors of a remote computing device in communication with an augmented reality device, a mixed reality device, and/or a mobile computing device in an urban environment. The specific references to data unit 136 and intelligence unit 140 indicate their roles in raw data processing and higher-level decision-making within a broader system architecture, paving the way for the detailed processing stages that follow.

At block 802, the one or more data units receive, using a first scanning device (e.g., from the first scanning device), first scan data associated with a physical environment. At block 804, the one or more data units may receive, using the first scanning device or a second scanning device (e.g., from the second scanning device), second scan data of the physical environment. It is appreciated that the one or more data units may be at the same location as the first scanning device and/or at the same location as the second scanning device according to some embodiments. In other embodiments, the one or more data units may be at different locations relative to the first scanning device and/or the second scanning device.

Turning to block 806, the one or more data units may generate, based on the first scan data, visual data (e.g., a visual map or first visual data) of the physical environment. At block 808, the one or more data units may generate, based on the first scan data or the visual data (e.g., the visual map), collision data (e.g., a collision map or second visual data) associated with the physical environment. Similarly, the one or more data units may generate, at block 810, based on the second scan data, feature data (e.g., a feature map or third visual data) associated with the physical environment.

Turning to block 812, the one or more data units may generate, based on the visual data, the collision data, and the feature data, spatial data (e.g., a spatial map) of the physical environment, the spatial data comprising the visual data, the collision data, and the feature data, such that: the visual data comprised in the spatial data enables displaying a 3-dimensional (3D) representation of the physical environment on a display device associated with one of a mixed reality device, an augmented reality device, or a mobile computing device; the collision data comprised in the spatial data enables navigating the physical environment using the display device; and the feature data comprised in the spatial data enables updating or controlling one or more virtual objects representing one or more physical objects in the physical environment. In other words, the various data comprised in the spatial data beneficially enable: determining, based on the visual data, visual information associated with a scanned physical environment; determining, based on the collision data, navigation information associated with the scanned physical environment; and determining, based on the feature data, feature information associated with the physical environment.

At block 814, the one or more data units may generate, based on the spatial data (e.g., the spatial map), a first library of data objects that is useable in an authoring computing operation for the updating or controlling (e.g., updating contextual or non-contextual information) the one or more virtual objects representing the one or more physical objects in the physical environment. The first library of data objects comprises one or more basis data objects or primitives that are parameterizable and bindable to the spatial data and/or to detected objects, and that are configured to effect modifications to the spatial data and to associated virtual objects. The basis data objects or primitives include, by way of non-limiting example, geometric constructs (e.g., points, line segments, polylines, curves, splines, planar polygons, meshes, volumetric solids, voxels) for digitally customizing or augmenting portions of the physical environment; location anchors that resolve to one or more detected locations, structures, or surfaces in the physical environment and that are expressed in one or more coordinate frames of the spatial data (e.g., spatial map); semantic tags and attribute templates for attaching contextual information to detected objects; interaction affordances and behavior rules that define visibility, interaction state, and update conditions; and rendering descriptors that define style, color, opacity, occlusion, and layering information relative to the spatial data (e.g., spatial map). Each basis data object or primitive may include fields such as a unique identifier, type, transform feature (e.g., position, orientation, scale), anchor reference, constraint data, attribute value, event/condition-action data, and access-control metadata, thereby enabling an authoring computing operation to instantiate, compose, and persist higher-order data objects that govern operation of the augmented environment.

According to one embodiment, the first library of data objects is configured to control or modify the spatial data, including adding, updating, or removing contextual information about detected objects in the physical environment, refining or constraining navigation elements, defining exclusion or hazard zones, correcting or smoothing geometry, and specifying occlusion and clipping behaviors for virtual content. For example, an author may select a detected object and apply a basis data object comprising a classification template and compliance indicator that, when bound to the object's anchor, causes the system to render contextual status information and to propagate corresponding logic into pathfinding and rule evaluation. In further examples, primitives such as corridor centerlines, waypoint nodes, or doorway planes may be attached to structural surfaces to enrich the spatial data (e.g., spatial map) for downstream guidance, analytics, or interaction flows. The first library may be generated server-side and stored in a repository associated with the spatial data (e.g., spatial map), may be versioned, and may support transactional updates and conflict resolution across multiple authoring sessions.

In alternative embodiments, the one or more data units may be used to generate a second library of data objects that is usable on a client or user device to provide end-user feedback and/or enable customizations by an end user distinct from an author with access to the first library of data objects. The second library of data objects may comprise a curated subset and/or variants of the basis data objects or primitives that are tailored for end-user operations within role-appropriate permissions and data scopes. Such basis data objects or primitives can include lightweight geometric markers for pinning notes or preferences to locations or structures in the physical environment; user-placeable location anchors (e.g., pin drops, bookmarks) that bind to detected surfaces or data frames of reference associated with the spatial data; personalization overlays for adjusting guidance cues, labels, or accessibility settings; quick-action regions for reporting issues, rating experiences, or suggesting corrections; and temporal prompts that attach to routes, points of interest, or equipment. The second library of data objects may support local, device-level persistence and may enforce sandboxing to prevent structural edits reserved to the first library, and may include policy descriptors that constrain spatial and temporal scope, visibility to other users, and escalation workflows whereby end-user artifacts can be reviewed and, if approved, promoted into compatible constructs within the first library of data objects and/or the spatial data.

In some cases, generation of the first and/or second library of data objects is performed by a computing processing pipeline that derives anchors, geometry, and semantic candidates from the spatial data and detected objects, assigns candidate templates from a type taxonomy, and materializes corresponding basis data objects or primitives with initialized parameters and bindings. The authoring computing operation consumes the first library to make authoritative modifications (e.g., via an authoring instruction) and publish updates to the spatial data (e.g., spatial map) and associated virtual objects, while the client or user system consumes the second library to accept end-user customizations and feedback that are reflected in the user's mixed-reality experience and are optionally synchronized for subsequent triage, reconciliation, or incorporation into the first library of data objects and/or the spatial data.

In response to receiving an authoring instruction associated with the spatial data (e.g., the spatial map), the one or more data units may execute, at block 816, based on the feature data (e.g., the feature map) or the first library of data objects, the authoring computing operation for the updating or controlling the one or more virtual objects representing the one or more physical objects in the physical environment, thereby generating updated spatial data (e.g., an updated spatial map) comprising one or more updated virtual objects associated with the physical environment.

Turning to block 818, the one or more data units may receive a map request and initiate, at block 820, rendering, based on the map request, an interactive 3D representation of the updated spatial data (e.g., the updated spatial map) on the display device. Additionally, the one or more data units may enable display of, at block 822, based on the rendering, one or more of: navigation data on the display device, thereby providing at least one of: path guidance within the physical environment, turn-by-turn directional data within the physical environment, wayfinding cue data within the physical environment, or route confirmation data associated with the physical environment; contextual data associated with at least one detected physical object in the physical environment on the display device; attribute data associated with the at least one detected physical object in the physical environment on the display device; compliance or operational data associated with the at least one detected physical object in the physical environment on the display device; and identifier data associated with the at least one detected physical object in the physical environment on the display device. It is appreciated that the contextual data can include at least one of: data describing external, historical, situational, or status-related information about the detected physical object. It is further appreciated that the attribute data comprises data describing intrinsic properties or measurable characteristics of the detected physical object, sometimes derived from scanning, sensing, or object-classification models. In one embodiment, the compliance data comprises data describing rules, constraints, status indicators, or operational conditions that relate to how the detected physical object can be handled, often tied to regulatory, safety, or process requirements. Additionally, the identifier data can comprise a data reference for naming, indexing, authenticating, or tracking the detected physical object.

In other embodiments, a system and a computer program product can include or execute the method described above. These and other implementations may each optionally include one or more of the following features.

The first scanning device comprises a first Light Detection and Ranging (LiDAR) system or a first depth sensing system while the second scanning device comprises the first LiDAR system or the first depth sensing system, or a second LiDAR system or a second depth sensing system, according to some embodiments.

Furthermore, the first scan data referenced above can comprise first 3D image data associated with the physical environment while the second scan data comprises second 3D image data associated with the physical environment.

According to one embodiment, at least one of: the visual data (e.g., the visual map) comprises a photorealistic high-fidelity 3D presentation of the physical environment configured for immersive data manipulation when rendered on the display device; the collision data (e.g., the collision map) is based on a pathfinding control logic that automatically constructs one or more spatial navigation pathways in the physical environment, the collision data (e.g., the collision map) being optimized for one or more of—collision or motion dynamics in the physical environment, human or non-human behavior evaluation in the physical environment, interaction analysis between: two or more humans in the physical environment, two or more objects in the physical environment, or a human and a virtual object or non-virtual object in the physical environment, or approximate scene visualization of the physical environment; the visual data (e.g., the visual map) has a first resolution that is greater than a second resolution of the collision data (e.g., the collision map), and the feature data (e.g., the feature map) is based on a Visual Positioning System (VPS) computing process that: extracts one or more spatial features associated with the physical environment, and anchors one or more virtual objects to the one or more spatial features for accurate localization within the physical environment.

In exemplary implementations, the mixed reality device or the mobile computing device comprises at least one sensor comprising at least one of: (LiDAR) depth sensor; a multi-camera depth system; a Red-Green-Blue (RGB) wide camera; an RGB ultra-wide camera; an RGB telephoto camera; a first Inertial Measurement Unit (IMU) comprising an accelerometer; a second IMU comprising a gyroscope; a third IMU comprising a magnetometer; an ambient light and proximity sensor; a Simultaneous Localization and Mapping (SLAM)-oriented visual sensor including a vision-based tracking camera; a barometer; a Global Navigation Satellite System (GNSS) or a Global Positioning System (GPS) receiver; an Ultra-Wideband (UWB) radio; or a Wi-Fi or a Bluetooth beacon.

In some cases, the mixed reality device, the augmented reality device, or the mobile computing device is configured for intelligently detecting or sensing one or more of image data, depth and range data, motion data, location data, environmental data, spatial mapping data, or Visual Positioning System (VPS) data, real-time video data or image data associated with the physical environment using the mixed reality device or the mobile computing device.

Additionally, the interactive 3D representation of the updated spatial data (e.g., the updated spatial map) comprises one or more of: structural element data associated with a physical surface of a structure in the physical environment; surface geometry data associated with a pathway within the physical environment; environmental object data associated with one or more objects in the physical environment; navigation data associated with the physical environment; or landmark data associated with the physical environment.

It is appreciated that the map request is processed based on: detecting an object in the physical environment using one of the mixed reality device, the augmented reality device, or the mobile computing device; generating, based on the detecting, raw object data associated with the physical environment; applying at least one intelligence model to analyze the raw object data associated with the physical environment, thereby generating context data associated with the physical environment; and generating, based on the context data, the interactive 3D representation of the updated spatial data (e.g., the updated spatial map), the context data comprising one or more of: metadata associated with the object, location attribute data associated with the object, navigation rules data associated with the physical environment, operational context data associated with the physical environment, environmental context data associated with the physical environment, or user data associated with the at least one of the mixed reality device, the augmented reality device, or the mobile computing device.

The at least one intelligence model (e.g., the intelligence model henceforth), according to one embodiment, can comprise one or more of: an object detection computing model, a segmentation computing model, a feature extraction computing model, a classification or regression model, a tracking model, a scene-graph or relationship-inference model, an optical character recognition model, a sequence or temporal-smoothing model, a rule-based post-processor, or an ensemble thereof. The intelligence model may be executed using one or more computing device processors or data units associated with the mixed reality device, the augmented reality device, or the mobile computing device (on-device), or associated with a server system in communication therewith (remote inference), or in a split configuration where pre-processing occurs on-device and inference occurs remotely, with the execution venue selected according to latency, bandwidth, privacy, or energy constraints.

In some embodiments, the intelligence model receives raw object data comprising, without limitation, image frames, depth values, point-cloud fragments, surface normals, motion vectors, and device pose estimates generated during detection by one of the mixed reality device, the augmented reality device, or the mobile computing device. The intelligence model can perform normalization (e.g., photometric calibration, geometric rectification), region-of-interest extraction, and modality fusion to form a model input tensor aligned to a common coordinate frame of the updated spatial data (e.g., the updated spatial map), thereby enabling consistent attribution of outputs to corresponding anchors, surfaces, or objects.

The intelligence model can also be used to produce context data that can include: (i) metadata associated with a detected object (e.g., object class, subtype, instance identifier, state, pose, dimensions, text labels, or recognized markings); (ii) location attribute data associated with the detected object (e.g., anchor association, floor or level, zone identifier, proximity to navigable surfaces, ingress/egress orientation); (iii) navigation rules data associated with the physical environment (e.g., one-way corridor indication, restricted area designation, detour availability, speed or flow constraints); (iv) operational context data associated with the physical environment (e.g., maintenance status, inspection status, occupancy or queue length, availability windows, compliance state); (v) environmental context data associated with the physical environment (e.g., illumination class, weather exposure, noise or vibration levels, obstruction presence); and (vi) user data associated with the at least one of the mixed reality device, the augmented reality device, or the mobile computing device (e.g., role, permissions, accessibility preferences, recent interaction history) used to tailor presentation or filtering of the interactive 3D representation of the updated spatial data (e.g., the updated spatial map).

In certain implementations, the intelligence model performs temporal analysis and tracking to stabilize context data over time, associating successive detections with a persistent object hypothesis and smoothing outputs via filters (e.g., Kalman or exponential smoothing). The intelligence model may also generate confidence scores and/or uncertainty estimates for each element of the context data, which the system uses to gate updates to the updated spatial data (e.g., the updated spatial map), to request additional samples, or to fall back to prior values. Where multiple intelligence models are employed, an ensemble or orchestrator may reconcile outputs by majority voting, weighted blending by model calibration, or priority by object class, thereby yielding a single, coherent context data record.

According to some embodiments, the intelligence model enforces policy and privacy constraints on user data prior to inclusion in the context data. For example, the intelligence model can anonymize identifiers, coarsen location attributes to policy-approved granularity, or redact fields based on the role associated with the mixed reality device, the augmented reality device, or the mobile computing device. The intelligence model can further map raw findings to navigation rules data and operational context data by invoking a rule engine or learned policy head that translates detections (e.g., a blocked doorway) into actionable constraints (e.g., mark passage as temporarily closed and propose an alternative route).

In further embodiments, the intelligence model can contribute explanatory artifacts (e.g., salient regions, attention maps, or feature attributions) that are stored with the context data and are optionally rendered as overlays within the interactive 3D representation of the updated spatial data (e.g., the updated spatial map) to indicate why a particular navigation rule, operational status, or metadata assignment is presented. Such artifacts enable author review, facilitate audit trails, and support conflict resolution when multiple users provide feedback via the second library of data objects.

The intelligence model may be continually refined using feedback derived from authoring operations or verified ground truth data associated with the physical environment. When the disclosed system detects discrepancies between predicted context data and authoritative updates to the updated spatial data (e.g., the updated spatial map), the intelligence model can schedule re-training or parameter calibration, subject to governance controls, thereby improving future inference quality without altering the structure of the updated spatial data (e.g., the updated spatial map).

To meet interactive latency targets associated with the map request, the intelligence model can utilize caching and incremental inference: previously computed embeddings for static regions of the physical environment are reused, while inference is focused on regions implicated by the current detection. The intelligence model may also select a model tier (e.g., lightweight on-device variant versus high-capacity remote variant) based on available compute, network conditions, and the criticality of the requested context data.

The context data generated by the intelligence model may be linked or bound to data anchors and object identifiers in the updated spatial data (e.g., the updated spatial map) and drives synthesis of the interactive 3D representation presented to the mixed reality device, the augmented reality device, or the mobile computing device. By way of non-limiting example, metadata associated with the object can be used to determine labeling and disclosure panels; location attribute data associated with the object controls occlusion and alignment; navigation rules data associated with the physical environment affects path generation and turn-by-turn cues; operational context data associated with the physical environment modifies allowable actions and visual indicators; environmental context data associated with the physical environment adjusts rendering styles or visibility; and user data associated with the display device tailors prominence, accessibility modes, and action availability-thereby completing the intelligence model's role in transforming raw object data into the context-aware, interactive 3D representation of the updated spatial data (e.g., the updated spatial map).

It is further appreciated that the physical environment is a dynamic environment associated with time-varying conditions that are detectable using the at least one of the mixed reality device, the augmented reality device, or the mobile computing device, the time-varying conditions including at least one of: an object in motion, a person in motion, or a detected changing environmental state associated with the physical environment.

In some instances: the visual data (e.g., the visual map) has a first coordinate system and a first pivot; the collision data (e.g., the collision map) has a second coordinate system and a second pivot; and the feature data (e.g., the feature map) has a third coordinate system and a third pivot. According to one embodiment, the first coordinate system, the second coordinate system, or the third coordinate system comprises a spatial reference framework used to numerically define the positions and orientations of features within physical environment. According to one embodiment, the first pivot, the second pivot, or the third pivot comprises one or more anchor points or reference axes that define how an object, point cloud, or map is oriented and transformed within its coordinate system, especially for alignment between visual data, collision data, and feature data.

Furthermore, combining (e.g., aligning or merging) the visual data (e.g., the visual map), the collision data (e.g., the collision map), and the feature data (e.g., the feature map) comprises: determining, based on location data associated with the physical environment, a reference coordinate system associated with the physical environment; transforming, based on the first coordinate system and the first pivot, the visual data (e.g., the visual map) into the reference coordinate system to generate first map transform data; transforming, based on the second coordinate system and the second pivot, the collision data (e.g., the collision map) into the reference coordinate system to generate second map transform data; transforming, based on the third coordinate system and the third pivot, the feature data (e.g., the feature map) into the reference coordinate system to generate third map transform data; and aligning the first map transform data, the second map transform data, and the third map transform data to generate the spatial data (e.g., the spatial map). In some embodiments, the reference coordinate system may be based on the first coordinate system, the second coordinate system, or a third coordinate system referenced above.

In some implementations, the location data associated with the physical environment comprises one or more of: an indication associated with whether the physical environment is indoors or outdoors; availability of one or more referent anchors associated with the physical environment including one or more of geographic information system (GIS) readings associated with the physical environment; Internet-of-Things (IoT) or beacon data associated with the physical environment; feature data from visual positioning system (VPS) readings associated with the physical environment; or point cloud data associated with the physical environment.

According to one embodiment, generating the visual data (e.g., the visual map) comprises: constructing a point cloud of the physical environment; applying 3D Gaussian splatting to points within the point cloud; and reconstructing, based on the applying, a photorealistic representation of objects within the physical environment. In an arrangement consistent with blocks 802-810, the one or more data units can construct the point cloud by receiving the first scan data from the first scanning device and, in some cases, the second scan data from a second scanning device. The first scanning device and the second scanning device may include, as described elsewhere herein, depth-sensing, LiDAR-based, and/or photogrammetry capture systems that are configured to acquire range and/or multi-view imagery suitable for geometric reconstruction. It is appreciated that the mixed reality device, the augmented reality device, and the mobile computing device referenced herein are end-user display devices that consume the visual data (e.g., the visual map), the collision data (e.g., a collision map or second visual data), and the feature data (e.g., a feature map or third visual data) after such data are generated, and are distinct from the first scanning device and the second scanning device used to acquire the first scan data and the second scan data.

In some implementations, constructing the point cloud of the physical environment comprises: (i) performing intrinsic and extrinsic calibration and temporal synchronization across the first scan data and, when present, the second scan data; (ii) registering multiple captures into a common world reference frame by scan-to-scan and/or scan-to-map alignment; and (iii) executing point-level preprocessing—such as outlier rejection, denoising, normal estimation, curvature inference, and optional colorization—to yield a metrically consistent three-dimensional point cloud having per-point attributes (e.g., position, normal, color, confidence, timestamp, and device-of-origin). In certain embodiments, subsets of the point cloud are preliminarily associated with object hypotheses derived from the feature data (e.g., a feature map or third visual data) to facilitate downstream, object-aware reconstruction and rendering.

As used herein, 3D Gaussian splatting denotes a screen-space or view-space rendering and reconstruction technique in which the point cloud is represented, at least during rendering and/or optimization, as a collection of Gaussian primitives. As used herein, Gaussian primitives are parametric volumetric elements each characterized by: (a) a mean vector in three-dimensional space that corresponds to a point or a local cluster centroid in the point cloud; (b) a covariance representation (e.g., anisotropic covariance) that defines spatial extent and orientation; and (c) radiometric parameters such as color (e.g., RGB), opacity, and, in some cases, view-dependent coefficients. Applying 3D Gaussian splatting to points within the point cloud may comprise instantiating a set of Gaussian primitives from the preprocessed points and projecting such Gaussian primitives into one or more virtual camera views corresponding to acquisition poses associated with the first scan data and/or the second scan data, and compositing contributions via depth-aware, z-ordered, or alpha-blended accumulation to synthesize rendered images. The one or more data units may compute discrepancies between the synthesized images and corresponding images included in the first scan data and/or the second scan data and adjust positions, covariances, and radiometric parameters of the Gaussian primitives to reduce reconstruction error and improve photorealistic fidelity.

In further embodiments, applying 3D Gaussian splatting includes enforcing occlusion correctness and compactness of the visual data (e.g., the visual map). Occlusion correctness may be achieved by ordering Gaussian primitives according to projected depth and compositing nearer elements before farther elements so that nearer elements attenuate or occlude farther elements consistent with scene geometry. Compactness may be achieved by pruning Gaussian primitives whose projected contribution falls below a defined threshold, merging neighboring Gaussian primitives exhibiting similar covariance and radiometric attributes, or organizing Gaussian primitives into a multi-resolution or level-of-detail hierarchy to facilitate adaptive streaming and rendering on the display device. In some cases, each Gaussian primitive is linked, via metadata, to associated entries in the feature data (e.g., a detected object identifier or a location anchor) and to occupancy or traversability indicators associated with the collision data, thereby simplifying subsequent fusion into the spatial data (e.g., a spatial map) at block 812.

Reconstructing, based on the applying, a photorealistic representation of objects within the physical environment may comprise outputting a view-synthesizable asset formed by the optimized set of Gaussian primitives such that, when rendered from multiple viewpoints on the display device, the resulting images exhibit photometric and geometric coherence with the first scan data and, where applicable, the second scan data. In some embodiments, the one or more data units further derive geometric proxies (e.g., meshes, planar patches, signed-distance field iso-surfaces, or other surface proxies) from the Gaussian primitives to support interactions that benefit from explicit surfaces while retaining the Gaussian-primitive representation to preserve appearance fidelity. The photorealistic representation is recorded in the coordinate framework shared with the feature data (e.g., a feature map or third visual data) and the collision data (e.g., a collision map or second visual data) so that the photorealistic representation can be deterministically composed into the spatial data (e.g., a spatial map) and subsequently displayed by the mixed reality device, the augmented reality device, or the mobile computing device consistent with blocks 818-822.

In certain implementations, generating the visual data (e.g., the visual map) further comprises associating the photorealistic representation with one or more indices, anchors, or semantic tags that reference object instances and/or structural regions identified in the feature data (e.g., a feature map or third visual data) and navigable features identified in the collision data (e.g., a collision map or second visual data). Such association enables the one or more data units, at block 814, to apply entries from the first library of data objects and, where appropriate, entries from a second library of data objects to select, update, or control one or more virtual objects representing corresponding physical objects within the photorealistic representation, including adding, updating, or removing contextual and non-contextual information without reprocessing the entire dataset. In embodiments supporting incremental updates, some Gaussian primitives whose reprojection error, semantic assignment, or change-detection metrics indicate a scene change are re-optimized, thereby enabling efficient refresh of the visual data (e.g., the visual map) from newly acquired first scan data and/or second scan data while maintaining consistency with the collision data (e.g., a collision map or second visual data) and the feature data (e.g., a feature map or third visual data).

It is appreciated that the above-described construction of the point cloud and application of 3D Gaussian splatting are performed by the one or more data units using the first scan data and, optionally, the second scan data acquired by the first scanning device and/or the second scanning device. The mixed reality device, the augmented reality device, and the mobile computing device are configured to receive and render the resulting interactive 3D representation of the spatial data (e.g., a spatial map) at blocks 820-822 and are not necessarily required to perform the acquisition or reconstruction steps described in this paragraph. In some embodiments, to facilitate delivery to such end-user devices, the one or more data units segment the photorealistic representation into streamable chunks (e.g., tiles or regions of interest) with dependency metadata and show an interface enabling the mixed reality device, the augmented reality device, or the mobile computing device to request, cache, and render only those portions of the visual data (e.g., the visual map) necessary for a current viewpoint or task context.

According to additional embodiments, the one or more data units generate quality measures and provenance data for the visual data (e.g., the visual map)—including coverage metrics, reprojection error statistics, alignment residuals with respect to the collision data (e.g., a collision map or second visual data), and completeness data (e.g., data scores) for object classes referenced in the feature data (e.g., a feature map or third visual data)—and persist such measures alongside the photorealistic representation. These measures may be consumed by an authoring computing operation when applying entries from the first library of data objects at block 814 and by client-side logic when determining which portions of the visual data (e.g., the visual map) to prioritize for rendering on the mixed reality device, the augmented reality device, or the mobile computing device.

Furthermore, combining the visual data (e.g., the visual map), the collision data (e.g., the collision map), and the feature data (e.g., the feature map) further comprises generating, based on at least the spatial data (e.g., the spatial map), the second library of data objects described elsewhere herein and which comprises at least one of: a geometric data object, an animation enabled spatial file, or a material defined 3D object, the second library of data objects is associated with profile data associated with at least one of the mixed reality device, the augmented reality device, or the mobile computing device, and the second library of data objects is usable by a user associated with the profile data when interacting with the updated spatial data (e.g., the updated spatial map) based on the map request.

In some embodiments, the identifier data comprises one or more of: license plate number data associated with a vehicle; asset tag data associated with the at least one detected physical object; QR code data associated with the at least one detected physical object; Near Field Communication (NFC) token data associated with the at least one detected physical object; or machine-readable identifier associated with the at least one detected physical object.

It is further appreciated that the updated spatial data (e.g., the updated spatial map) comprises a data file configured for at least one of: implementing computing operations associated with managing the physical environment; implementing interactive computing operations associated with the physical environment; crowd management computing operations associated with the physical environment; safety computing operations associated with the physical environment, or entertainment computing operations associated with the physical environment.

In some embodiments, the above method further comprises geo-referencing at least the spatial data (e.g., the spatial map) to the physical environment, the geo-referencing comprising anchoring the visual data (e.g., the visual map) to the Earth based on one or more of: a geographic information system (GIS) reading associated with the physical environment; or a visual-positioning-system (VPS) reading associated with the physical environment.

Additionally, the authoring instruction can be received via one or more computing platforms comprising: a web-browser interface associated with the mobile computing device, or a headset interface associated with the augmented reality device or the mixed reality device. In some instances, the web-browser interface and the headset interface are synchronized such that edits to the updated spatial data (e.g., the updated spatial map) performed via the web-browser interface are reflected (e.g., automatically, synchronously or asynchronously reflected) in the updated spatial data (e.g., the updated spatial map) when rendered on the headset interface. This can also occur vice versa, where updates made via the headset are reflected (e.g., automatically, synchronously, or asynchronously reflected) in the web-browser interface.

In certain implementations, the one or more data units establish a shared authoring session that associates a session identifier with both the web browser interface associated with the mobile computing device and the headset interface associated with the augmented reality device or the mixed reality device. The shared authoring session maintains a data state for one or more working sets of the updated spatial data (e.g., the updated spatial map), including version identifiers, change sets, and access-control metadata that correspond to author roles and permissions associated with the first library of data objects and, where applicable, the second library of data objects. The shared authoring session enables the one or more data units to accept an authoring instruction from either interface and/or apply such authoring instruction computationally to the updated spatial data (e.g., the updated spatial map).

According to some embodiments, synchronization between the web browser interface and the headset interface is facilitated by an event-based replication protocol operated by the one or more data units. The event-based replication protocol can publish, upon receipt of an authoring instruction, a change event that encapsulates at least: (i) a reference to affected entries in the first library of data objects and/or bindings within the updated spatial data (e.g., the updated spatial map); (ii) pre- and post-update parameter values (e.g., transform features, attribute values, rendering descriptors, constraint data); (iii) a temporal marker and an author identifier; and (iv) dependency information that specifies any prerequisite state. The web browser interface and the headset interface subscribe to such change events, and each interface applies the change events either synchronously (e.g., substantially in real time) or asynchronously (e.g., batched or deferred) based on network conditions, device capability, and policy.

In some embodiments, the one or more data units support multiple synchronization modes to accommodate heterogeneous connectivity between the mobile computing device, the augmented reality device, and the mixed reality device. In a first mode, synchronous reflection is used to update visualizations and interaction affordances (e.g., one or more properties of an object or interface element that enables or invites a particular action-what the object "allows" a user to do) of the updated spatial data (e.g., the updated spatial map) on the headset interface substantially immediately after an edit is committed on the web browser interface, thereby enabling live preview of authoring changes within the physical environment. In a second mode, asynchronous reflection is used to queue change events and apply them when the headset interface regains connectivity or when compute and thermal budgets permit safe application without degrading user experience. In both modes, the one or more data units maintain causal ordering using version identifiers to ensure that changes are applied in a deterministic sequence.

In some cases, the one or more data units implement conflict detection and resolution when concurrent edits originate from the web browser interface associated with the mobile computing device and the headset interface associated with the augmented reality device or the mixed reality device. Conflict detection may be performed using per-object or per-field versioning and vector timestamps that identify overlapping write intents to the same elements of the updated spatial data (e.g., the updated spatial map) or to the same entries in the first library of data objects. Resolution policies can include, by way of non-limiting example: last-writer-wins at a field granularity; role-weighted priority that favors edits from designated authors; merge-by-composition for geometric constructs (e.g., retaining both waypoints and merging corridor centerlines under a smoothing constraint); or deferral to user triage via an authoring review workflow generated on the web browser interface and mirrored on the headset interface.

In exemplary embodiments, the one or more data units propagate both authoritative changes (e.g., committed updates to the updated spatial data (e.g., the updated spatial map)) and provisional changes (e.g., draft modifications) with distinct visibility scopes. The headset interface associated with the augmented reality device or the mixed reality device may render provisional changes as preview overlays that are locally visible to authorized users while the web browser interface associated with the mobile computing device presents corresponding edit controls, audit trails, and "publish" actions. Upon publication, the one or more data units convert the provisional changes into authoritative updates, advance the version identifier of the updated spatial data (e.g., the updated spatial map), and issue change events that trigger synchronous or asynchronous reflection on all subscribed interfaces.

According to additional embodiments, the web browser interface provides authoring tools for creating and editing using entries from the first library of data objects (e.g., points, line segments, polylines, curves, splines, planar polygons, meshes, volumetric solids, voxels; location anchors; semantic tags; interaction affordances; behavior rules; and rendering descriptors), whereas the headset interface enables in-situ manipulation of the same entries within the rendered updated spatial data (e.g., the updated spatial map). For example, an author can use the headset interface to select a location anchor that is bound to a detected surface and nudge its transform features (e.g., position, orientation, scale) using view-aligned controls, while concurrently using the web browser interface to adjust attribute values, constraint data, and event/condition-action data of the corresponding data object. The one or more data units ensure that such split-surface edits are coalesced into a single transaction and reflected bi-directionally across both interfaces.

In some implementations, the one or more data units accommodate offline or intermittent-connectivity operation by allowing the web browser interface associated with the mobile computing device and the headset interface associated with the augmented reality device or the mixed reality device to cache local change sets against a pinned baseline version of the updated spatial data (e.g., the updated spatial map). Upon reconnection, the one or more data units reconcile the cached change sets with the current authoritative version using the conflict-resolution policies described herein and then perform the automatic, synchronous, or asynchronous reflection of the reconciled updates on all active interfaces.

It is appreciated that the synchronization described in this paragraph preserves the distinction between acquisition and consumption roles in the disclosed system architecture. The first scanning device and the second scanning device provide the first scan data and the second scan data from which the visual data (e.g., the visual map), the collision data (e.g., a collision map or second visual data), and the feature data (e.g., a feature map or third visual data) are generated by the one or more data units. The web browser interface associated with the mobile computing device and the headset interface associated with the augmented reality device or the mixed reality device serve as authoring and visualization surfaces for issuing the authoring instruction and for viewing, respectively, the updated spatial data (e.g., the updated spatial map) in accordance with blocks 814-822, and do not necessarily perform the scanning operations attributed to the first scanning device and/or the second scanning device.

In further embodiments, the one or more data units generate audit data artifacts for each authoring instruction received via the web browser interface or the headset interface, including, without limitation, an author identifier, a timestamp, a list of changed fields within the updated spatial data (e.g., the updated spatial map), and references to affected entries in the first library of data objects and/or the second library of data objects. The audit artifacts enable rollback of specific edits, facilitate compliance checks for the compliance or operational data displayed at blocks 820-822, and support reproducible reconstruction of prior states of the updated spatial data (e.g., the updated spatial map) for validation or dispute resolution.

The terminology used in this disclosure is for the purpose of describing particular exemplary embodiments and is not intended to be limiting. For example, as used herein, the singular forms "a," "an," and "the" may be intended to include plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, processes, elements, components, and/or groups thereof. The described method steps, processes, and operations are not to be construed as necessarily requiring their performance in the particular order discussed or illustrated, unless specifically identified as an order of performance. It is further appreciated that additional or alternative steps may be employed according to some implementations.

Although the terms first, second, third, etc., may be used to describe various elements, components, regions, layers and/or sections, these elements, components, regions, layers and/or sections should not be limited by these terms. These terms may be used to distinguish one element, component, region, layer or section from another element, component, region, layer or section. That is, terms such as "first," "second," and other numerical terms, when used in this disclosure, do not imply a sequence or order unless clearly indicated by the context. In addition, the term optimal and its variants (e.g., efficient, optimally, etc.) as used in this disclosure may simply indicate improving, rather than the ultimate form of 'perfection' or the like.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

The below exemplary definitions of terminologies is provided as context for one or more of the disclosed methods and systems:

AI (Artificial Intelligence): Simulation of intelligence by machines, especially computer systems, including learning, reasoning, and self-correction.

GIS (Geographic Information System): A framework for capturing, managing, and analyzing spatial or geographic data.

LiDAR (Light Detection and Ranging): Remote sensing technique using laser pulses to measure distances and create 3D models of environments.

3600 Imaging: Panoramic image capture covering the entire surroundings for comprehensive scene analysis.

GPU (Graphics Processing Unit): Specialized processor for rapid mathematical computations, used to accelerate AI and image processing.

LLM (Large Language Model): AI system trained on vast amounts of textual data, capable of understanding and generating human-like language, enabling conversational interfaces.

According to one embodiment, a method refers to a structured or unstructured set of operations executed by one or more computing device processors to perform the disclosed workflows associated with automated urban intelligence computing operations.

According to one embodiment, the term "urban" may refer to any physical environment containing man-made, natural, or mixed infrastructure in which monitoring, sensing, inspection, analysis, and/or intelligent computing operations may be performed. Although "urban" may include densely populated metropolitan regions and city centers, the term is not limited by population density, built-environment concentration, zoning category, or municipal boundaries. In various embodiments, "urban" may encompass suburban areas, peri-urban corridors, industrial zones, transportation networks, university or commercial campuses, rural roadways, sparsely populated regions, agricultural settings, remote environments, etc. that contain structures, assets, and/or geographic features capable of being captured, analyzed, and/or contextualized by the disclosed systems and methods.

In some embodiments, "urban" may describe any environment from which multimodal sensor data or non-multimodal sensor data, contextual data, and/or incident-related information can be captured, even where infrastructure is minimal or human presence is infrequent. For example, an "urban environment" may include a single stretch of roadway, dispersed utility equipment, an isolated industrial installation, a coastal perimeter, a lightly developed exurban landscape, etc. so long as physical conditions, events, and/or environmental states therein can be detected or inferred by one or more sensors or intelligence models. Accordingly, the term "urban" may function as an analytical domain classification, not a demographic one, and thereby covers any environment (e.g., dense, sparse, etc.) in which the disclosed systems can operate, generate incident data, perform validation operations, and/or support other automated or intelligent decision processes.

In some cases, "urban" may also refer to a range of developed land or property, from planned or zoned to fully-developed, and include a wide range of neighborhoods, communities, or other contiguous locations or persons having shared properties that lend themselves to the use of the disclosed systems and methods.

Furthermore, "urban intelligence" may refer to an automated or a semi-automated data acquisition, processing, interpretation, validation, and/or operational use of data (e.g., multimodal data, non-multimodal data, sensor data, etc.) associated with any such urban environment. Urban intelligence may include, but is not limited to, detecting, classifying, validating, contextualizing, and/or responding to physical conditions, assets, incidents, environmental attributes, and/or domain-specific events using image data, LiDAR data, GPS data, audio data, textual data, sensor metadata, fused multimodal data etc. In various embodiments, "urban intelligence" may be implemented using one or more intelligence models configured to perform multi-modal or non-multimodal analysis, select domain-appropriate validation pipelines, evaluate incident characteristics, generate confidence-based assessments, and/or initiate automated responses. These intelligence models may include rule-based validators, domain-specific AI models, transformer-based models, and/or multimodal or non-multimodal fusion models that collectively provide the computational substrate for carrying out urban intelligence functions. In this manner, urban intelligence may denote not only the informational outputs derived from an urban environment, but also the model-driven reasoning, inference, validation, and/or decision-support capabilities executed by the disclosed intelligence models, irrespective of whether the monitored environment is a dense metropolitan environment or a sparsely populated rural setting. Accordingly, the phrase "urban intelligence" may encompass any environment in which one or more intelligence models generate situational understanding data, context data, operational data, and/or automated decision outputs based on multimodal or non-multi-modal data associated with an urban environment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is appreciated that the scope of the present disclosure be limited not by this detailed description, but rather by the claims of this application. The present disclosure may be embodied in other specific forms without departing from the spirit or essential characteristics thereof. Accordingly, the above discussed subject-matter is illustrative, but not limiting, of the scope of the present disclosure, which is set forth in the following claim.

What is claimed is:

1. A method for rendering an interactive spatial map representing a physical environment, the method comprising:

receiving, using one or more computing device processors and a first scanning device, first scan data associated with a physical environment;

receiving, using the one or more computing device processors and the first scanning device or a second scanning device, second scan data of the physical environment;

generating, using the one or more computing device processors, based on the first scan data, a visual map of the physical environment;

generating, using the one or more computing device processors, based on the first scan data or the visual map, a collision map associated with the physical environment;

generating, using the one or more computing device processors, based on the second scan data, a feature map associated with the physical environment;

generating, using the one or more computing device processors, based on the visual map, the collision map, and the feature map, a spatial map of the physical environment, the spatial map comprising the visual map, the collision map, and the feature map, such that:

the visual map comprised in the spatial map enables displaying a 3-dimensional (3D) representation of the physical environment on a display device associated with one of a mixed reality device, an augmented reality device, or a mobile computing device, the collision map comprised in the spatial map enables navigating the physical environment using the display device, and the feature map comprised in the spatial map enables updating or controlling one or more virtual objects representing one or more physical objects in the physical environment;

generating, using the one or more computing device processors, based on the spatial map, a first library of data objects that is useable in an authoring computing operation for the updating or controlling the one or more virtual objects representing the one or more physical objects in the physical environment;

in response to receiving an authoring instruction associated with the spatial map, executing, using the one or more computing device processors, based on the feature map or the first library of data objects, the authoring computing operation for the updating or controlling the one or more virtual objects representing the one or more physical objects in the physical environment, thereby generating an updated spatial map comprising one or more updated virtual objects associated with the physical environment;

receiving, using the one or more computing device processors, a map request;

initiating rendering, using the one or more computing device processors, based on the map request, an interactive 3D representation of the updated spatial map on the display device; and enabling display of, using the one or more computing device processors, based on the rendering, one or more of:

navigation data on the display device, thereby providing at least one of: path guidance within the physical environment, turn-by-turn directional data within the physical environment, wayfinding cue data within the physical environment, or route confirmation data associated with the physical environment, contextual data associated with at least one detected physical object in the physical environment on the display device, attribute data associated with the at least one detected physical object in the physical environment on the display device, compliance or operational data associated with the at least one detected physical object in the physical environment on the display device, and identifier data associated with the at least one detected physical object in the physical environment on the display device.

2. The method of claim 1, wherein:

the first scanning device comprises a first Light Detection and Ranging (LiDAR) system or a first depth sensing system, and the second scanning device comprises the first LiDAR system, the first depth sensing system, a second LiDAR system, or a second depth sensing system.

3. The method of claim 1, wherein at least one of:

the first scan data comprises first 3D image data associated with the physical environment, and the second scan data comprises second 3D image data associated with the physical environment.

4. The method of claim 1, wherein at least one of:

the visual map comprises a photorealistic high-fidelity 3D presentation of the physical environment configured for immersive data manipulation when rendered on the display device, the collision map is based on a pathfinding control logic that automatically constructs one or more spatial navigation pathways in the physical environment, the collision map being optimized for one or more of:

collision or motion dynamics in the physical environment, a human or non-human behavior evaluation in the physical environment, an interaction analysis between:

two or more humans in the physical environment, two or more objects in the physical environment, or a human and a virtual object or non-virtual object in the physical environment, or an approximate scene visualization of the physical environment, the visual map has a first resolution that is greater than a second resolution of the collision map, and the feature map is based on a Visual Positioning System (VPS) computing process that:

extracts one or more spatial features associated with the physical environment, and anchors the one or more virtual objects to the one or more spatial features for accurate localization within the physical environment.

5. The method of claim 1, wherein the mixed reality device or the mobile computing device comprises at least one sensor comprising at least one of: a LiDAR depth sensor, a multi-camera depth system, a Red-Green-Blue (RGB) wide camera, an RGB ultra-wide camera, an RGB telephoto camera, a first Inertial Measurement Unit (IMU) comprising an accelerometer, a second IMU comprising a gyroscope, a third IMU comprising a magnetometer, an ambient light and proximity sensor, a Simultaneous Localization and Mapping (SLAM)-oriented visual sensor including a vision-based tracking camera, a barometer, a Global Navigation Satellite System (GNSS) or a Global Positioning System (GPS) receiver, an Ultra-Wideband (UWB) radio, or a Wi-Fi or a Bluetooth beacon.

6. The method of claim 1, wherein the mixed reality device, the augmented reality device, or the mobile computing device is configured for intelligently detecting or sensing one or more of image data, depth and range data, motion data, location data, environmental data, spatial mapping data, Visual Positioning System (VPS) data, or real-time video data or image data associated with the physical environment.

7. The method of claim 1, wherein the interactive 3D representation of the updated spatial map comprises one or more of:

structural element data associated with a physical surface of a structure in the physical environment, surface geometry data associated with a pathway within the physical environment, environmental object data associated with one or more objects in the physical environment, the navigation data associated with the physical environment, or landmark data associated with the physical environment.

8. The method of claim 1, wherein the map request is processed based on:

detecting an object in the physical environment using one of the mixed reality device, the augmented reality device, or the mobile computing device, generating, based on the detecting, raw object data associated with the physical environment, applying at least one intelligence model to analyze the raw object data associated with the physical environment, thereby generating context data associated with the physical environment, and generating, based on the context data, the interactive 3D representation of the updated spatial map, the context data comprising one or more of:

metadata associated with the object, location attribute data associated with the object, navigation rules data associated with the physical environment, operational context data associated with the physical environment, environmental context data associated with the physical environment, or user data associated with the one of the mixed reality device, the augmented reality device, or the mobile computing device.

9. The method of claim 1, wherein the physical environment is a dynamic environment associated with time-varying conditions that are detectable using at least one of the mixed reality device, the augmented reality device, or the mobile computing device, the time-varying conditions including at least one of: an object in motion, a person in motion, or a detected changing environmental state associated with the physical environment.

10. The method of claim 1, wherein:

the visual map has a first coordinate system and a first pivot, the collision map has a second coordinate system and a second pivot, and the feature map has a third coordinate system and a third pivot.

11. The method of claim 10, wherein the generating the spatial map comprises combining the visual map, the collision map, and the feature map, wherein the combining comprises:

determining, based on location data associated with the physical environment, a reference coordinate system associated with the physical environment, transforming, based on the first coordinate system and the first pivot, the visual map into the reference coordinate system to generate first map transform data, transforming, based on the second coordinate system and the second pivot, the collision map into the reference coordinate system to generate second map transform data, transforming, based on the third coordinate system and the third pivot, the feature map into the reference coordinate system to generate third map transform data, and aligning the first map transform data, the second map transform data, and the third map transform data to generate the spatial map.

12. The method of claim 11, wherein the location data associated with the physical environment comprises one or more of:

an indication associated with whether the physical environment is indoors or outdoors, or an availability of one or more referent anchors associated with the physical environment including one or more of:

geographic information system (GIS) readings associated with the physical environment, Internet-of-Things (IoT) or beacon data associated with the physical environment, feature data from visual positioning system (VPS) readings associated with the physical environment, or point cloud data associated with the physical environment.

13. The method of claim 1, wherein generating the visual map comprises:

constructing a point cloud of the physical environment, applying 3D Gaussian splatting to points within the point cloud, and reconstructing, based on the applying, a photorealistic representation of objects within the physical environment.

14. The method of claim 1, wherein:

the combining the visual map, the collision map, and the feature map further comprises generating, based on at least the spatial map, a second library of data objects comprising at least one of: a geometric data object, an animation enabled spatial file, or a material defined 3D object, the second library of data objects is associated with profile data associated with at least one of the mixed reality device, the augmented reality device, or the mobile computing device, and the second library of data objects is usable by a user associated with the profile data when interacting with the updated spatial map based on the map request.

15. The method of claim 1, wherein the identifier data comprises one or more of:

license plate number data associated with a vehicle, asset tag data associated with the at least one detected physical object, QR code data associated with the at least one detected physical object, Near Field Communication (NFC) token data associated with the at least one detected physical object, or machine-readable identifier associated with the at least one detected physical object.

16. The method of claim 1, wherein the updated spatial map comprises a data file configured for at least one of:

implementing computing operations associated with managing the physical environment, implementing interactive computing operations associated with the physical environment, crowd management computing operations associated with the physical environment, safety computing operations associated with the physical environment, or entertainment computing operations associated with the physical environment.

17. The method of claim 1, further comprising geo-referencing at least the spatial map to the physical environment, the geo-referencing comprising anchoring the visual map to the Earth based on one or more of:

a geographic information system (GIS) reading associated with the physical environment, or a visual-positioning-system (VPS) reading associated with the physical environment.

18. The method of claim 1, wherein:

the authoring instruction is received via one or more computing platforms comprising:

a web-browser interface associated with the mobile computing device, or a headset interface associated with the augmented reality device or the mixed reality device, and the web-browser interface and the headset interface are synchronized such that edits to the updated spatial map performed via the web-browser interface are reflected in the updated spatial map when rendered on the headset interface.

19. One or more systems for rendering an interactive spatial map representing a physical environment, the one or more systems comprising:

one or more computing device processors; and memory storing instructions, the instructions being executable by the one or more computing device processors to:

receive, using a first scanning device, first scan data associated with a physical environment;

receive, using the first scanning device or a second scanning device, second scan data of the physical environment;

generate, based on the first scan data, a visual map of the physical environment, wherein the visual map has a first resolution;

generate, based on the first scan data or the visual map, a collision map associated with the physical environment, wherein the collision map has a second resolution;

generate, based on the second scan data, a feature map associated with the physical environment;

combine the visual map, the collision map, and the feature map, thereby generating a spatial map of the physical environment comprising the visual map, the collision map, and the feature map, such that:

the visual map comprised in the spatial map enables displaying a 3-dimensional (3D) representation of the physical environment on a display device associated with one of a mixed reality device, an augmented reality device, or a mobile computing device, the collision map comprised in the spatial map enables navigating the physical environment using the display device, and the feature map comprised in the spatial map enables updating or controlling one or more virtual objects representing one or more physical objects in the physical environment;

generate, based on the spatial map, a first library of data objects that is useable in an authoring computing operation for the updating or controlling the one or more virtual objects representing the one or more physical objects in the physical environment;

in response to receiving an authoring instruction associated with the spatial map, execute, based on the feature map or the first library of data objects, the authoring computing operation for the updating or controlling the one or more virtual objects representing the one or more physical objects in the physical environment, thereby generating an updated spatial map comprising one or more updated virtual objects associated with the physical environment;

receive a map request;

initiate rendering based on the map request, an interactive 3D representation of the updated spatial map on the display device; and enable display of, based on the rendering, one or more of:

navigation data on the display device, thereby providing at least one of:

path guidance within the physical environment, turn-by-turn directional data within the physical environment, wayfinding cue data within the physical environment, or route confirmation data associated with the physical environment, contextual data associated with at least one detected physical object in the physical environment on the display device, attribute data associated with the at least one detected physical object in the physical environment on the display device, compliance or operational data associated with the at least one detected physical object in the physical environment on the display device, and identifier data associated with the at least one detected physical object in the physical environment on the display device.

20. The one or more systems of claim 19, wherein at least one of:

the visual map comprises a photorealistic high-fidelity 3D presentation of the physical environment configured for immersive data manipulation when rendered on the display device, the collision map is based on a pathfinding control logic that automatically constructs one or more spatial navigation pathways in the physical environment, the collision map being optimized for one or more of:

collision or motion dynamics in the physical environment, a human or non-human behavior evaluation in the physical environment, an interaction analysis between:

two or more humans in the physical environment, two or more objects in the physical environment, or a human and a virtual object or non-virtual object in the physical environment, or an approximate scene visualization of the physical environment, and the feature map is based on a Visual Positioning System (VPS) computing process that:

extracts one or more spatial features associated with the physical environment, and anchors the one or more virtual objects to the one or more spatial features for accurate localization within the physical environment.

* * * * *